United States Patent [19]
Griffith et al.

[11] Patent Number: 6,072,519
[45] Date of Patent: Jun. 6, 2000

[54] DUAL RESOLUTION PRINTER

[75] Inventors: John D. Griffith; Badhri Narayan, both of Rochester; Michael E. Harrigan, Webster, all of N.Y.

[73] Assignee: Eastman Kodak Company, Rochester, N.Y.

[21] Appl. No.: 08/960,821

[22] Filed: Oct. 30, 1997

[51] Int. Cl.[7] .................................................. G02B 7/04
[52] U.S. Cl. .................... 347/241; 347/242; 347/244; 347/256; 347/257; 359/813
[58] Field of Search ................... 347/241, 242, 347/244, 254, 256, 257, 258; 359/813, 662; 369/112

[56] References Cited

U.S. PATENT DOCUMENTS

| | | | |
|---|---|---|---|
| 3,944,323 | 3/1976 | Starkweather | 359/215 |
| 4,398,787 | 8/1983 | Balasubramanian | 359/211 |
| 4,528,561 | 7/1985 | Kitamura | 345/195 |
| 4,651,170 | 3/1987 | Chandler et al. | 347/259 |
| 4,728,965 | 3/1988 | Kessler et al. | 347/241 |
| 4,821,113 | 4/1989 | McQuade et al. | 358/510 |
| 4,943,870 | 7/1990 | Sugishima | 358/451 |
| 5,018,805 | 5/1991 | Kessler | 347/232 |
| 5,113,455 | 5/1992 | Scott | 382/298 |
| 5,475,415 | 12/1995 | Noethen | 347/241 |
| 5,515,097 | 5/1996 | Munechika et al. | 347/241 |
| 5,666,447 | 9/1997 | Chuang et al. | 385/31 |
| 5,835,280 | 11/1998 | Griffith | 359/662 |

OTHER PUBLICATIONS

Modern Optical Engineering, The Design of Optical Systems, Second Edition, Waren Smith, pp. 272, 380–382.

*Primary Examiner*—N. Le
*Assistant Examiner*—Hai C. Pham
*Attorney, Agent, or Firm*—Svetlana Z. Short

[57] ABSTRACT

A dual resolution printer for printing images on an associated print medium includes: a light source providing a light beam and a focusing lens focusing the light beam and creating a converging light beam having at least one beam waist of at least one wavelength at a first beam waist location. The printer also includes an optical unit movable in and out of the converging light beam and having a corresponding first and second position, respectively. This optical unit, in the second position, reimages the beam waist of the converging light beam created by the focusing lens to a different size second beam waist, at a location substantially the same as the first beam waist location.

12 Claims, 13 Drawing Sheets

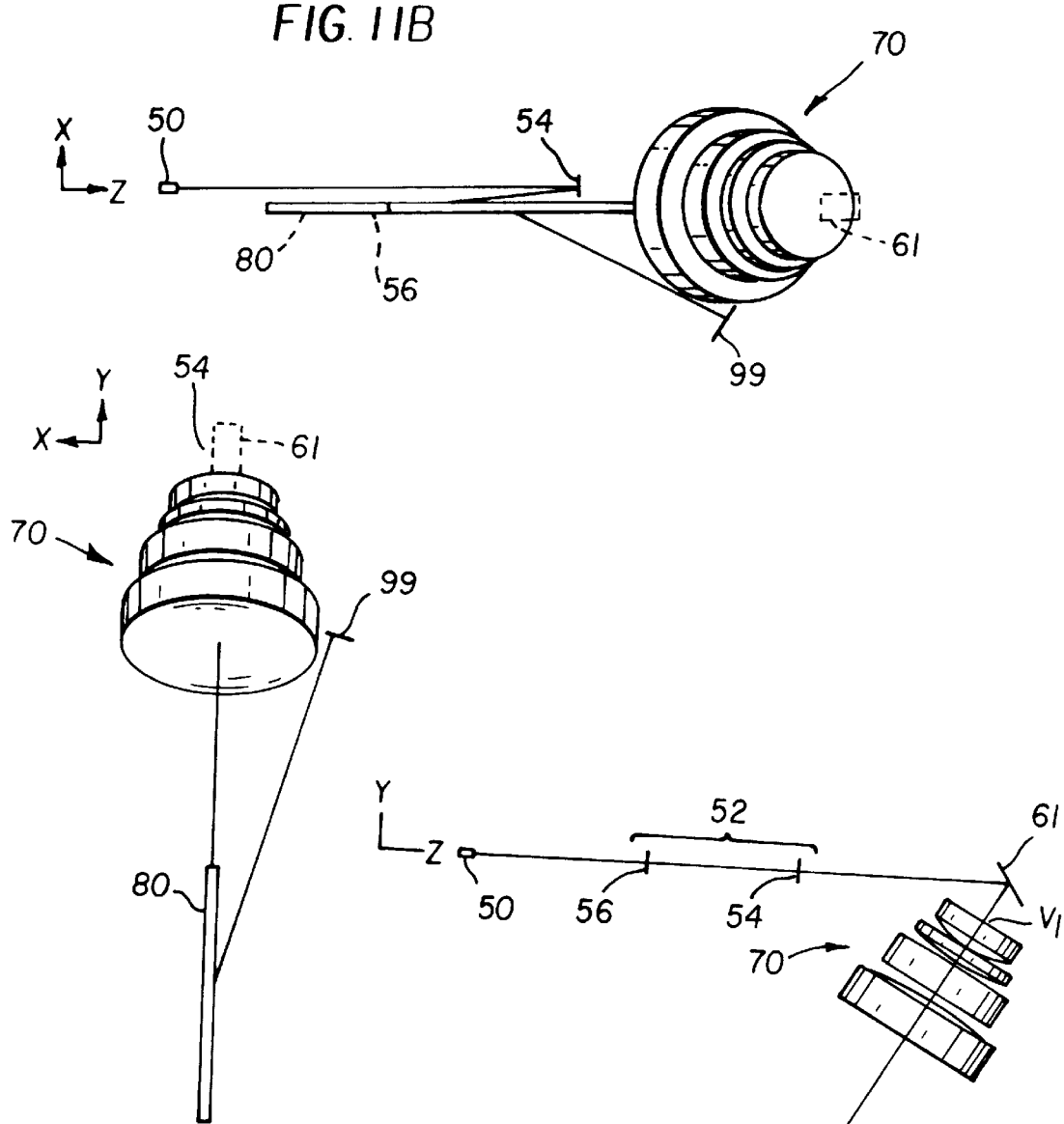

DUAL RESOLUTION PRINTER

CROSS REFERENCE TO RELATED APPLICATION

This application is related to commonly assigned, copending U.S. application Ser. No. 08/961,117, entitled, A Bravais Lens, in the name of John D. Griffith, filed concurrently herewith.

FIELD OF THE INVENTION

This invention relates to dual resolution printers and more particularly, to the use of an optical unit to change a spot size of such printers.

BACKGROUND OF THE INVENTION

Generally, color laser printers have operated with a fixed resolution, often specified in terms of dots per inch (dpi). For example, 300 dpi and 600 dpi laser printers are commonly found in office environments. In such laser printers the spot size (i.e., the size of the printed dot) at a print medium remains fixed.

A superior quality photoprint requires high resolution (about 600 or more dpi). A good quality photoprint can be made with the lower resolution (300 dpi) printers.

The higher the resolution, the more pixels are associated with a given size image area and the more data information needs to be processed for the given size image area. While printing of monochromatic text requires only two intensity levels (zero and full saturation) and only one color (black), color imaging requires the application of multiple colors (red, green blue, for example) in many levels of intensity (256 or 512, or even 16,000,000 levels, for example). Thus, a laser printer capable of printing photographic quality color pictures must process a very large amount of image data describing an image.

It is desirable for a printer to produce a large volume of prints per a given unit of time. If a high speed printing (about 5 or more prints per second) requirement is added to the requirement of high resolution, multicolor printing, it becomes difficult to electronically process this amount of data in a short period of time. A lower resolution printer (about 300 dpi) would satisfy the faster printing requirement by decreasing the amount of data (per second) needed to be processed, but would also decrease the image quality of all prints.

The industry recognized that many print jobs do not require high resolution and, that overall productivity would be increased by a printer capable of both fast production of low resolution prints, and slower production of high resolution prints. However, at a lower resolution, having fewer exposed pixels per inch leaves white spaces between the exposed pixels. (FIGS. 1A and 1B illustrate schematically a section of a high and a low resolution photoprint, respectively.) These white spaces degrade the quality of a photoprint, giving it a "washed out" appearance.

It has been proposed that LED printers utilize two adjacent LEDs to expose each of two adjacent (cross track) pixels with the same information (processing data for only half of the pixels and cutting the amount of time required for data processing in half). This technique would eliminate white spaces between the exposed pixels, but only in a cross track (i.e., line) direction. It would leave white lines of unexposed pixels (white space) in the in-track direction between scan lines A, B (FIG. 1C).

A laser printer, to facilitate faster prints, may expose two adjacent cross track pixels with the identical data so as to reduce the amount of unexposed pixels and thus minimize the amount of "white spaces". This approach, however minimizes the "white space" in a cross track (i.e., line) direction only. It would still leave a line of unexposed pixels between the two lines of exposed pixels. This problem could be remedied by exposing an additional line of pixels in the in-track direction between the lines A and B and making this exposure identical to that of the line A—i.e., by printing the same line twice. This is illustrated in FIG. 1D. This technique, by printing the same line twice, eliminates extra image processing for every other line. However, because this technique still results in printing twice as many lines, it would take twice as long to make each photoprint.

SUMMARY OF THE INVENTION

An object of the present invention is to provide an improved printer capable of (i) fast printing of good quality photographic color prints, and (ii) high resolution printing of superior quality photographic color prints.

It is another object of the present invention to improve appearance of prints produced in a fast printing mode, and more particularly to minimize the amount of white spaces between the exposed pixels.

According to the present invention, a dual resolution printer for printing images on an associated print medium includes: a light source providing a light beam and a focusing lens focusing the light beam and creating a converging light beam having at least one beam waist of at least one wavelength at a first beam waist location. The printer also includes an optical unit movable in and out of the converging light beam and having a corresponding first and second position, respectively. This optical unit, in the second position, reimages the beam waist of the converging light beam created by the focusing lens to a different size second beam waist, at a location substantially the same as the first beam waist location.

According to one embodiment of the present invention, a dual resolution printer includes a laser source providing a light beam; a focusing lens focusing the light beam and creating a converging light beam having at least one beam waist of at least one wavelength at a first beam waist location; a deflector scanning the light beam; and an f-θ optics located between the deflector and the associated print medium. The f-θ optics images a spot of a predetermined size on the associated print medium. The printer also includes an optical unit movable in and out of the converging light beam and having a corresponding first and second position, respectively. This optical unit, in the second position, reimages the beam waist of the converging light beam created by the focusing lens to a different size second beam waist, at a location substantially the same as the first beam waist location. The two positions correspond to two different spot sizes at the print medium, providing the printer with appropriate spot sizes when printing in low and high resolution modes.

BRIEF DESCRIPTION OF THE DRAWINGS

The foregoing and other objects, features and advantages of the invention as well as presently preferred embodiments thereof will become more apparent from reading the following description in connection with the accompanying drawings:

FIGS. 11B–11D are three perspective views of the f-θ lens of FIG. 10A, pre-polygon beam shaping and focusing optics, post-polygon cylindrical mirror, and an associated image surface.

FIGS. 12A–12C show the path of the deflected light beam 42 for the polygon rotations of 0°,-13.5°, and +13.5°, respectively.

DESCRIPTION OF THE PREFERRED EMBODIMENT

Dual Resolution Capability

It is desirable for a printer to be capable of (i) fast production of good quality photoprints 2, and (ii) slower production of superior quality photoprints. To accomplish this, the laser printer 5 (see FIGS. 2A and 2B) of one embodiment of the invention operates in multiple modes where each mode has a different resolution. This change in resolution corresponds to a change in spot size at the print medium. Thus, when the printer 5, operates in a high resolution mode (more dpi) it produces small size spots 6 (0.07 mm at $\lambda$=532 nm) at a print medium (FIG. 2C). When this same printer operates at higher printing speeds (lower resolution mode, fewer dpi), it produces larger size spots 7 (0.10 mm in diameter, $\lambda$=532 nm) at the print medium (FIG. 2D). These larger size spots 7 minimize the amount of white space between the exposed pixels. Thus, if the printer 5 is operating at 512 and 350 dpi modes, it can print about twice as fast in a low resolution mode—i.e., the ratio of print speeds is (512/350). If the difference between the two resolutions is greater, the printer, when operating in a lower resolution mode can print even faster. For example, the difference in print speed between the 300 dpi mode and the 600 dpi mode is a factor of two, i.e. (600/300).

Figure 1A:
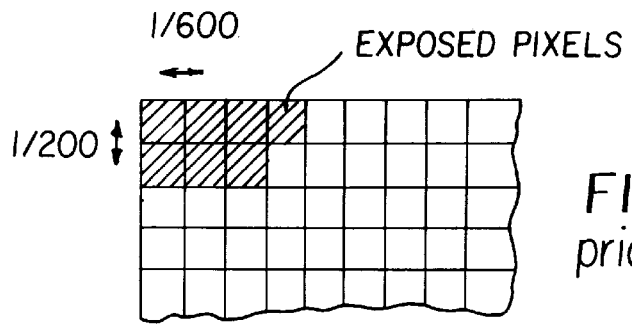
FIGS. 1A–1D illustrate prior art pixel exposure on a print.
Figure 1B:
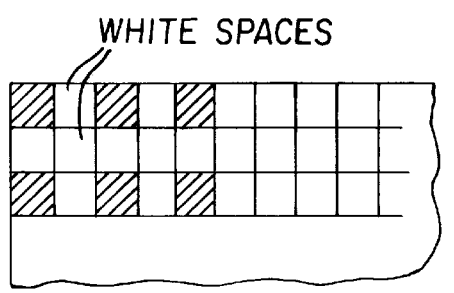
Figure 1C:
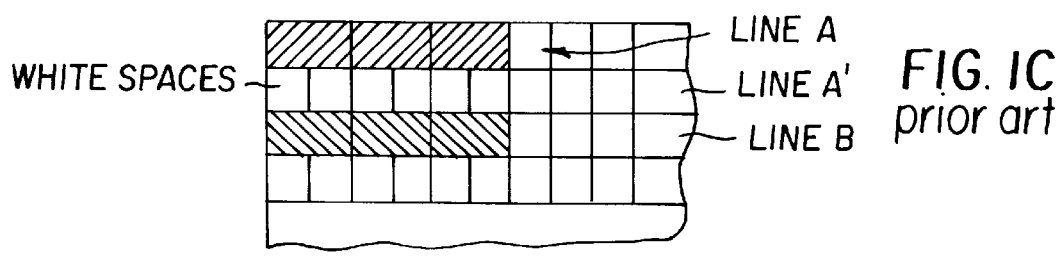
Figure 1D:
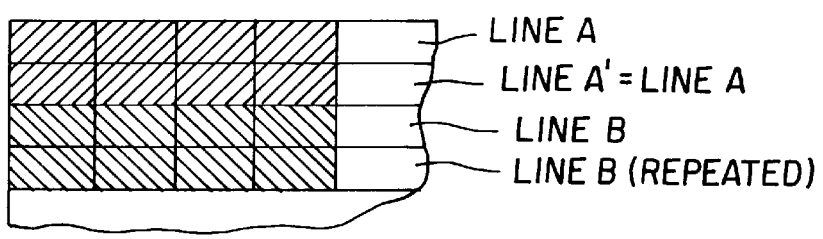
Figure 2A:
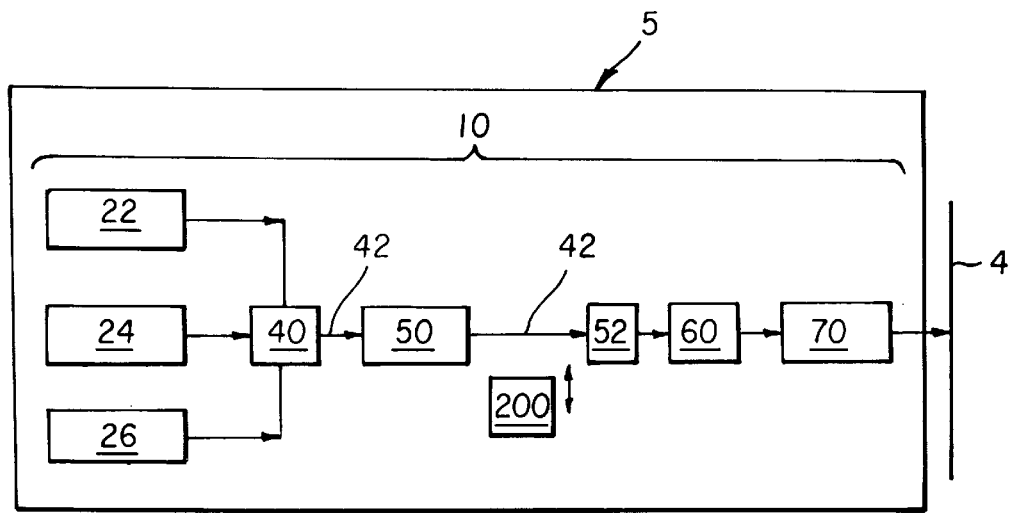
FIG. 2A is a schematic illustration of a primary optical system with a Bravais lens not inserted into a light beam.
Figure 2B:
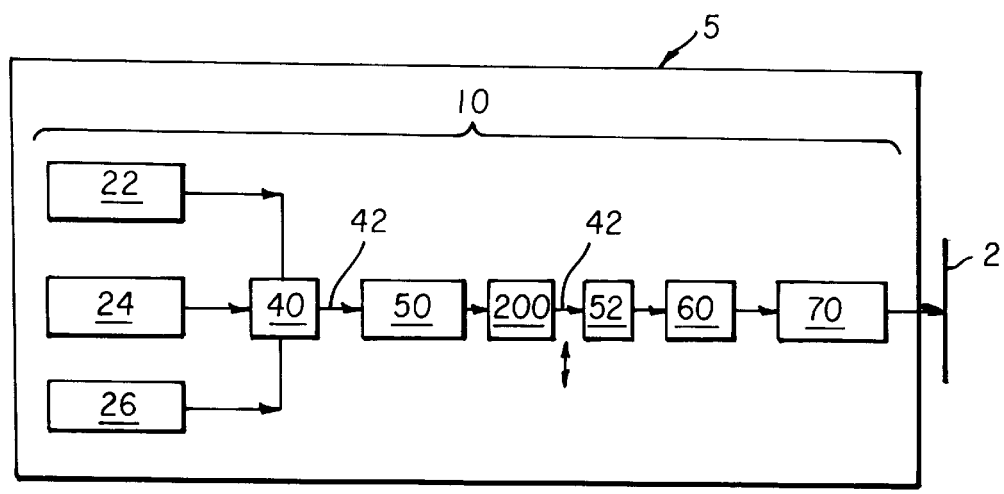
FIG. 2B is a schematic illustration of the primary optical system with the Bravais lens inserted into the light beam.
Figure 2C:
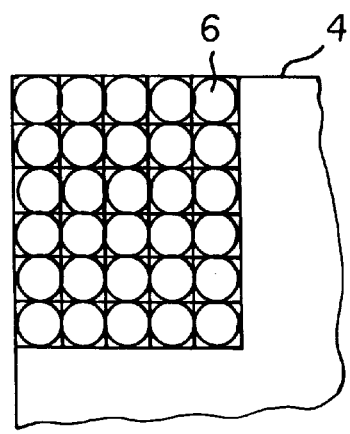
FIG. 2C is a schematic illustration of spot sizes and separations produced on a section of a print medium when a printer is operating in a high resolution mode.
Figure 2D:
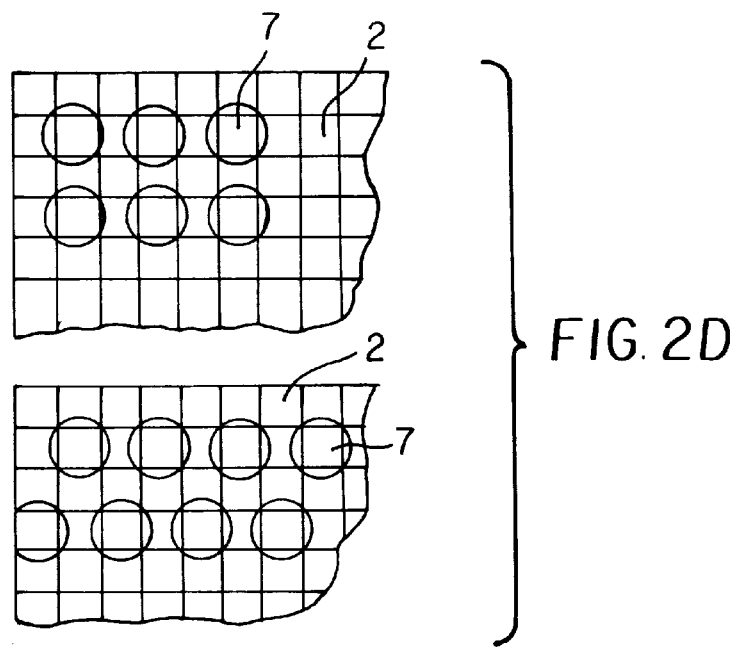
FIG. 2D is a schematic illustration of spot sizes and separations produced on a section of a print medium when a printer is operating in a low resolution, high speed mode.
Figure 2E:
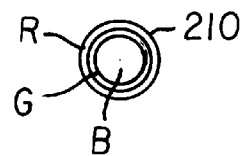
FIG. 2E is a schematic illustration of a composite beam waist formed by a focusing lens of the primary optical system.

More specifically, the printer 5 includes a primary optical system 10 shown in FIGS. 2A and 2B and described in detail in the "Primary Optical System" section of the specification. This primary optical system 10 comprises laser light sources 22, 24, 26 providing green, red and blue laser light beams, respectively, a fiber-optic multiplexer 40, a focusing lens 50, a beam shaping optics 52, a deflector in the form of a polygon scanner 60 and an f-θ lens 70. The fiber optics multiplexer 40 combines the red, blue and green laser light beams into a single beam 42. The focusing lens 50 intercepts and focuses this single beam 42, converging it and forming a beam waist 210. This beam 210 is a composite beam waist and contains three coplanar waists, red (R), green (G) and blue (B). See FIG. 2E.

A Bravais type lens is a lens that forms an image of a (virtual) object at the location of this object. This image may be of a larger or a smaller size than the object. A Bravais lens is a lens that forms an image of a larger size than the object. Such a lens is described, for example, in Modern Optical Engineering, The Design of Optical Systems, Second Edition, page 272. A reverse Bravais lens is a lens that forms an image of a smaller size than the object.

According to one embodiment of the present invention, the primary optical system 10 of the laser printer 5 is also provided with an optical unit in the form of a Bravais lens 200 that can be inserted into a converging light beam 42 that exits the focusing lens 50. See FIGS. 2A and 2B. The commonly assigned, copending U.S. application Ser. No. 08/961,117, filed concurrently herewith, discloses this Bravais lens.

Figure 3A:
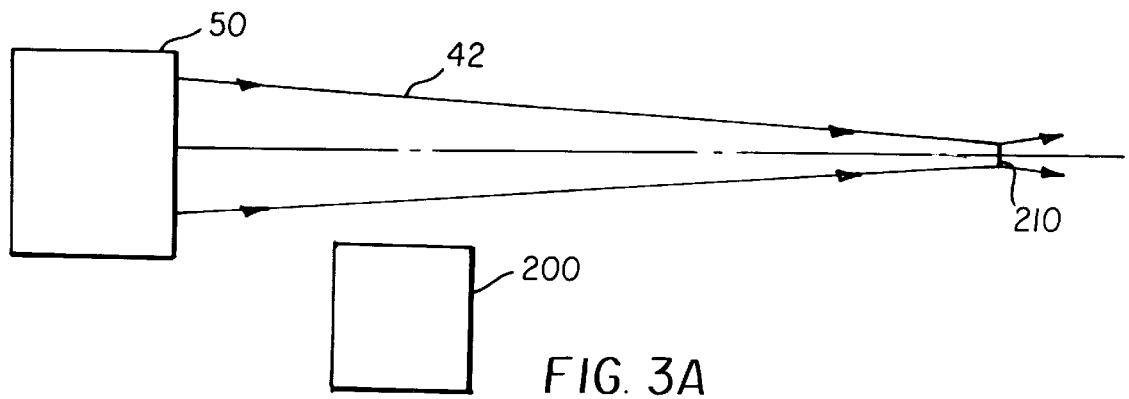
FIGS. 3A and 3B illustrate schematically how the Bravais lens increases the size of a beam waist without altering the location of the beam waist.
Figure 3B:
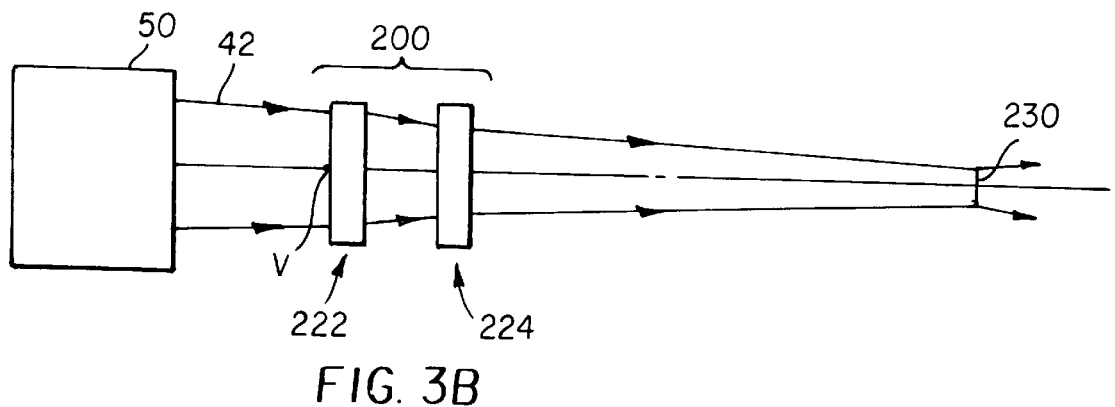

The beam waist 210 serves as a (virtual) object to the Bravais lens 200. The Bravais lens 200 reimages the beam waist 210 and provides a composite beam waist 230 (see FIG. 3B) of increased size (relative to the beam waist 210) at the same position as where the beam waist 210 was located. This is illustrated in FIGS. 3A and 3B.

Because the light beam 42 comprises laser light beams, 210 and 230 beam waists are not a geometric (i.e. are not paraxial) object and image, but are laser beam waists. These waists 210 and 230 are formed at locations that are at different longitudinal positions (along the optical axis of the Bravais lens) than the corresponding geometric object and image.

When the Bravais lens 200 is inserted into the light beam 42, the only change seen by the downstream optics (such as the beam shaping optics 52) of the primary optical system 10 is a change in the size of the beam waist formed by the focusing lens 50. This, in turn, changes spot size at the print medium. Because the Bravais lens 200 provides a larger waist size, it is used to increase the size of the spot at the print medium when the printer 5 is used in a low resolution mode. As stated earlier, this increase in spot size minimizes the amount of "white space" between the exposed pixels.

Figure 3C:
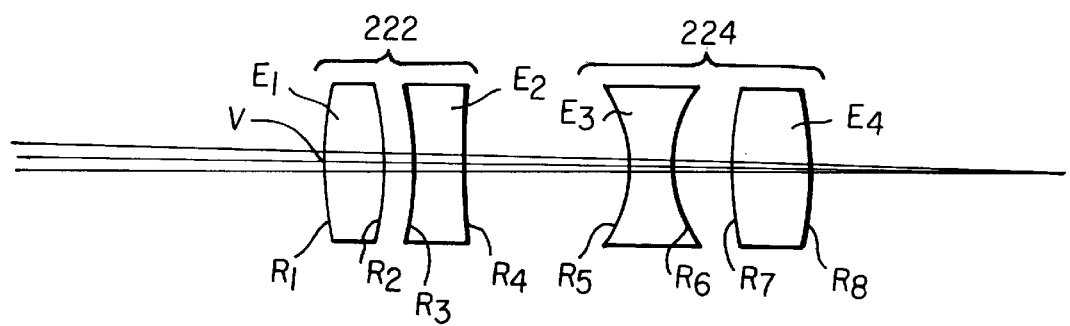
FIG. 3C shows an embodiment of the Bravais lens.

The overall Bravais lens 200 has a negative focal length. The Bravais lens 200 comprises a front positive lens group 222 (facing the focusing lens 50) followed by a negative lens group 224 (FIG. 3C). The positive lens group 222 comprises a positive power lens element $E_1$ and a negative power lens element $E_2$. The negative lens group has a negative lens element $E_3$ and a positive lens element $E_4$.

An embodiment of the Bravais lens 200 used in a printer 5 according to the present invention is set out in detail in Table 1. In this and other embodiments, the "front" of the Bravais lens is the side facing the focusing lens 50 and, the "rear" of the Bravais lens is the image side. The radii of curvature $R_1$ to $R_8$, are numbered from front to rear, the thicknesses and spacings for a surface are the thickness or spacing immediately to the rear of that surface. The indexes of refraction $N_d$ are for the sodium d line of the spectrum wavelength and Vd is the Abbe V-number.

TABLE 1

| SURF | CLEAR APER | AXIAL BEAM | RADIUS | THICKNESS | INDEX Nd | Vd | MATERIAL |
|---|---|---|---|---|---|---|---|
| 1 | 1.91 | 1.91 | 16.189 | 3.000 | 1.487 | 84.5 | FK-51 |
| 2 | 1.75 | 1.70 | -16.189 | 1.500 | | | |
| 3 | 1.55 | 1.46 | -13.672 | 2.330 | 1.558 | 54.2 | KZFSN-2 |
| 4 | 1.44 | 1.31 | 70.462 | 8.254 | | | |
| 5 | 0.96 | 0.59 | -6.197 | 2.000 | 1.487 | 84.5 | FK-51 |
| 6 | 0.99 | 0.54 | 6.197 | 3.000 | | | |
| 7 | 1.27 | 0.55 | 16.610 | 4.000 | 1.558 | 54.2 | KZFSN-2 |
| 8 | 1.40 | 0.51 | -16.610 | | | | |

The Bravais lens 200 of the first embodiment has the following characteristics:

In Table 1, the clear apertures, and pupil diameters are based on twice the $1/e^2$ diameter of a light beam with wavelength λ=685 nm and waist $1/e^2$ radius of 0.0179 mm.

More specifically, this Bravais lens 200 is designed to image red, green and blue beam waists into larger beam waists without changing the location of these beam waists. This is shown in the table below:

TABLE 2

| | Input | | Output | |
|---|---|---|---|---|
| Wavelength | ωo | Z | ωo | Z |
| 532 mm | .01426 | .000 | .02086 | .000 |
| 457.9 mm | .01298 | -.004 | .01896 | -.005 |
| 685 mm | .01789 | .048 | .02624 | .062 | where ωo is the $1/e^2$ radius of a beam waist and Z is the distance from the original (green) beam waist location to beam the waist location formed by the Bravais lens 200. All linear measurements are in millimeters. This table indicates that all of the beam waists are essentially coplanar.

Figure 6A:
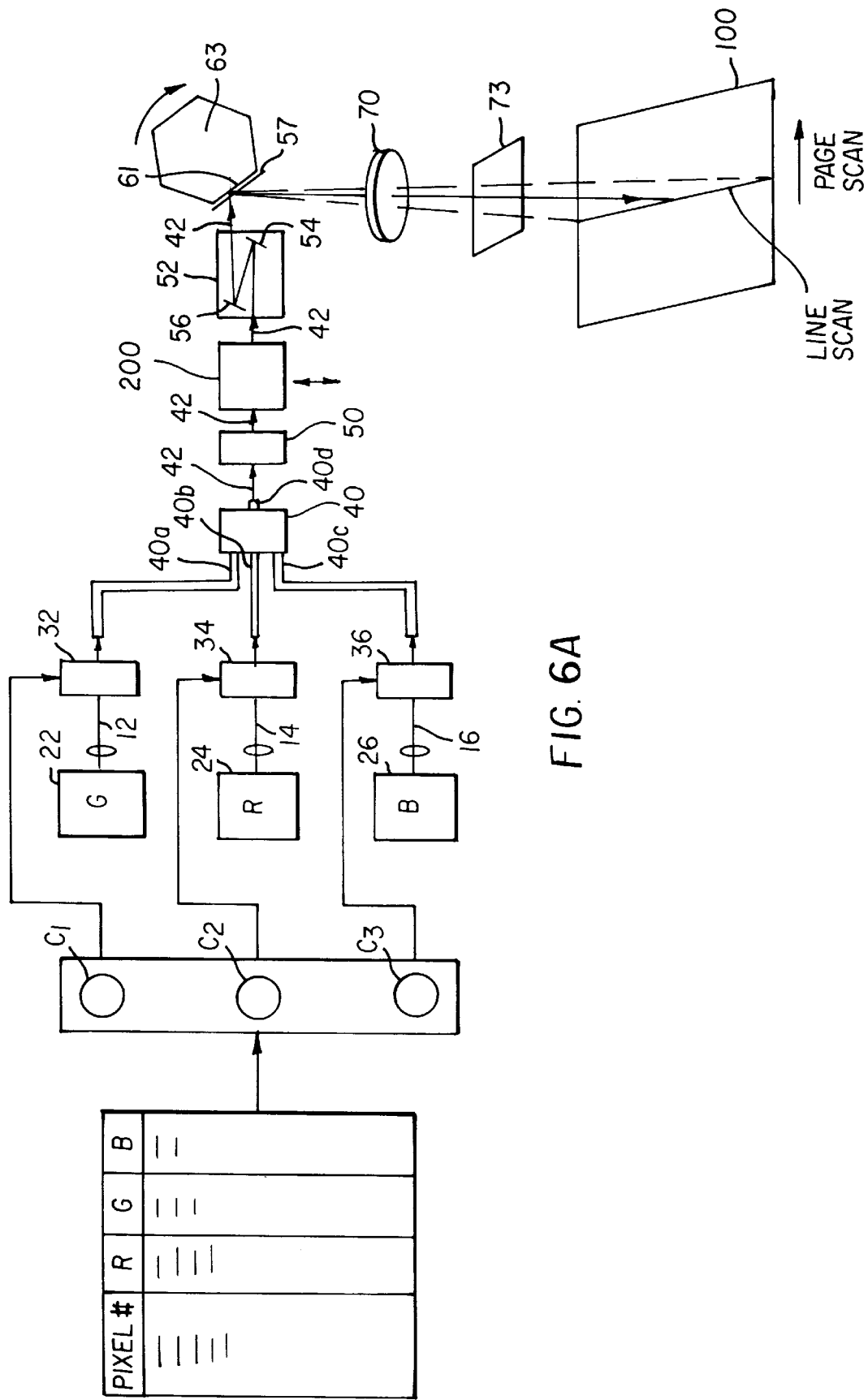
FIG. 6A is a schematic illustration of an embodiment of a printer including a digital image store and a processor unit.

An apochromatic lens is a lens that is free from chromatic aberration at three wavelengths. In the printer 5, the three beam waists, one at each of the three wavelengths, are located at the output end 40d of the fiber-optic multiplexer 40 (FIGS. 6A). The focusing lens 50 follows the fiber-optic multiplexer 40. The three beams of different wavelengths (red, green and blue light beams) are coaxial when they pass through the focusing lens 50 and the three waists (red, green and blue) forming the beam waist 210, are coplanar. Thus, the Bravais lens 200 must be apochromatic so as not to produce a substantial change in the location of any of the three (red, green and blue) waists when the Bravais lens is inserted into the converging beam exiting the focusing lens 50.

The Bravais lens 200 of Table 1 is designed to be apochromatic in a Gaussian beam sense. As stated above, the Bravais lens 200 transforms a (composite) beam waist 210 located 39.15 mm behind its frontmost vertex V into a larger beam waist 230 located essentially in the same plane. (See FIGS. 3A and 3B). The degree of apochromatism can be seen in Table 2. Because this Bravais lens 200 is apochromatic, it requires glasses that have anomalous partial dispersion: FK-51 and KZFSN-2, for example. Other glass choices with anomalous partial dispersions are possible. Such glasses are known to those of ordinary skill in the art of optics. A detailed description of such glasses is provided on page 380–382 of the book "Modern Optical Engineering, The Design of Optical Systems", by W. J. Smith.

In this design, the first, third, and fourth lens element $E_1$, $E_3$, $E_4$ are symmetric for ease of assembly. That is, there is no distinction between a first and rear surface in these lens elements and one can not assemble the lens element backwards. Given the center air thickness of 8.254 mm (between lens group 222 and 224), it is preferred that the focal length efl(1) of the first lens element $E_1$ be approximately equal to the focal length efl(4) of the fourth lens element $E_4$ and, that the focal length efl(2) of the second lens element $E_2$ be approximately double the focal length efl(3) of the third lens element $E_3$. That is:

0.85 efl(4)≦efl(1)≦1.1 efl(4), and 3.0 efl(3)≦efl(2)≦4.0 efl(3).

More specifically, the Bravais lens 200 satisfies the following conditions:
efl(1)/efl=−0.35
efl(2)/efl=0.41
efl(3)/efl=0.12
efl(4)/efl=−0.31, where efl is a focal length of the Bravais lens 200.

Depending on glass choice, bendings, and center separation, other acceptable design solutions can also be found.

Figure 4A:
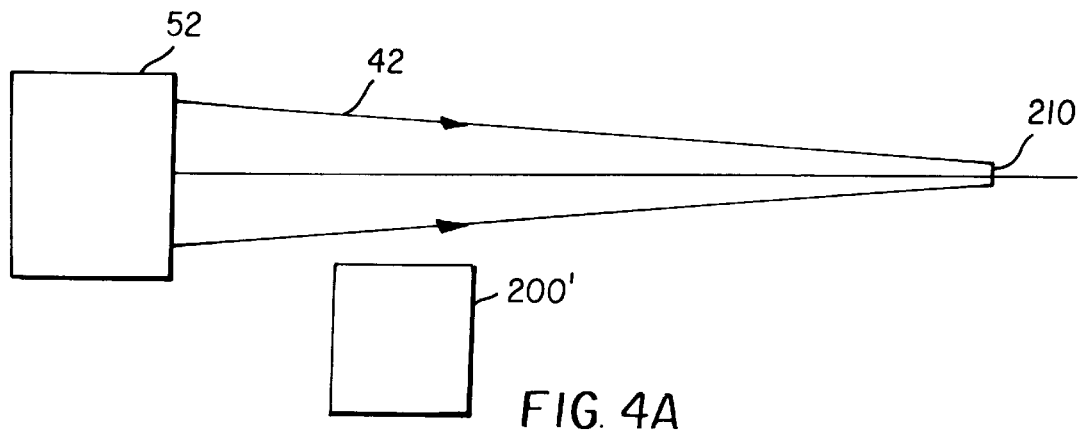
FIGS. 4A and 4B illustrate schematically how a reverse Bravais decreases the size of the beam waist without altering the location of the beam waist.
Figure 4B:
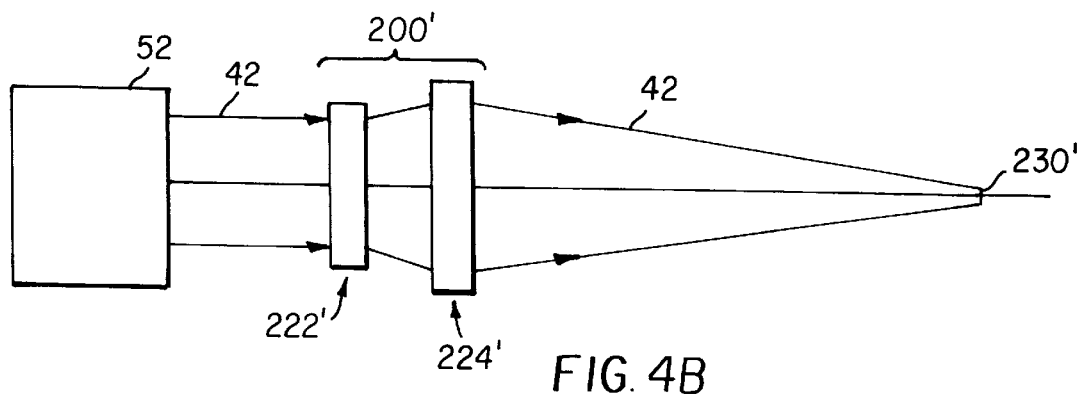
Figure 5:
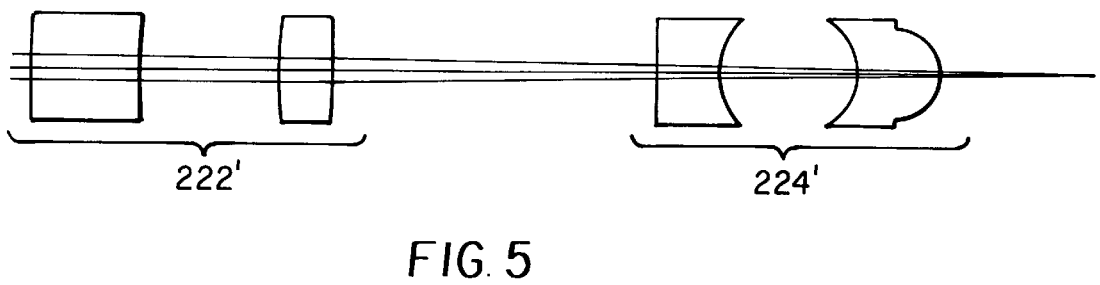
FIG. 5 shows an embodiment of the reverse Bravais lens.

As described above, the Bravais lens 200 is inserted into the beam 42 of the printer 5 to increase the size of the spot written onto the print medium when the printer 5 is used in a low resolution mode. Conversely, a reverse Bravais lens can be used to decrease the size of the spot written onto the print medium when the printer is used in a high resolution mode. A reverse Bravais lens 200' comprises of a negative lens group 222' followed by a positive lens group 224'. It produces a reduced size waist 230' at the location of the waist 210'. This is illustrated in FIGS. 4A and 4B. An embodiment of a reverse Bravais lens 200' is set out in detail in Table 3 and is illustrated in FIG. 5.

TABLE 3

| RADIUS | THICKNESS | CLEAR APERTURE RADIUS | INDEX | Vd | MATERIAL |
|---|---|---|---|---|---|
| 87.778 | 4.000 | 2.000 | 1.588 | 54.2 | KZFSN2 |
| 15.740 | 5.000 | 2.000 | | | AIR |
| 11.767 | 2.000 | 2.000 | 1.487 | 84.5 | FK51 |
| -35.529 | 12.000 | 2.000 | | | AIR |
| -206.830 | 2.330 | 2.000 | 1.558 | 54.2 | KZFSN2 |
| 2.933 | 5.000 | 2.000 | | | AIR |

TABLE 3-continued

| RADIUS | THICKNESS | CLEAR APERTURE RADIUS | INDEX | Vd | MATERIAL |
|---|---|---|---|---|---|
| −2.243 | 3.000 | 2.000 | 1.487 | 84.5 | FK51 |
| −1.653 | 5.818 | 2.000 | | | AIR |

The reverse Bravais lens 200' of Table 3 was also designed to be apochromatic on axis in a Gaussian beam sense. The lens transforms the beam waist 210 located 39.15 mm behind the first vertex of the first lens element into a smaller beam waist 230' located essentially at the same plane. The degree of apochromatism can be seen from the following table:

TABLE 4

| | INPUT | | OUTPUT | |
|---|---|---|---|---|
| WAVELENGTH | $\omega_o$ | Z | $\omega_o$ | Z |
| 532 | .01426 | .000 | .00975 | 0.000 |
| 457.9 | .01298 | −.004 | .00876 | 0.005 |
| 685 | .01789 | .048 | .01227 | 0.061 | where $\omega_o$ is the $1/e^2$ radius of the beam waist Z is the distance from the original object waist location to the final waist location. All linear measurements are in millimeters.

This reverse Bravais lens 200' has glasses that have anomalous partial dispersion. Other glass choices with anomalous partial dispersion are possible. Given the center air thickness of 12 mm (between the groups 222' and 224'), it is preferred that the second lens element $E_2'$ be about twice as strong as lens element $E_1'$. It is also preferred that the optical powers of the two rear lens elements ($E_3'$ and $E_4'$) be about the same. More specifically, the reverse Bravais lens 200' satisfies the following equations:

efl (1st element)/efl=−6.835
efl (2nd element)/efl=3.600
efl (3rd element)/efl=−1.006
efl(4th element)/efl=−0.946

Depending on glass choice, bending, and center separation (between the two lens groups of 222' and 224') other acceptable design solutions may also be found.

It is noted that Bravais lenses (or reverse Bravais lenses) which are not color corrected can also be used in color laser printers, to change spot sizes, provided that each lens is inserted into its corresponding light beam at a location where the beams of different wavelengths are not coaxial. For example, in a laser printer such as the one disclosed in U.S. Pat. No. 5,018,805, a plurality of monochromatically corrected Bravais lenses could be inserted into the laser beams. They should be placed somewhere between the individual lasers and the means by which the laser beams from the individual lasers are combined.

Primary Optical System

In the following discussion and throughout this application the term "page direction" means the cross-scan direction. It is the direction perpendicular to the scan line produced by a rotation of a polygon or other deflector. The term "line direction" means the direction of the scan line produced by the rotation of the polygon or other deflectors. These directions must be understood in the context of the local coordinate system of an optical component; the coordinate system will be tilted by fold mirrors. The optical axis of the printer system is the Z axis, the page direction is the X direction, and the line direction is the Y-direction.

FIG. 6A illustrates a printer 5 including a digital image store, a processor unit and the Primary Optical System 10. The primary optical system 10 is provided with a plurality of light sources 22, 24 and 26. The light sources 22, 24 and 26 are laser sources that emit red, green and blue wavelength light beams 12, 14 and 16, respectively. These light beams 12, 14 and 16 are propagated to a plurality of acoustooptic modulators. In this embodiment the acoustooptical modulators 32, 34, and 36 are used as the light modulating means for modulating the light beams by image information. However, the light modulating means is not limited thereto. Other means for modulating the light beams may be employed.

Each of these acoustooptic modulators 32, 34, 36 modulates its associated light beam by changing its intensity according to the image data provided. This will be discussed in more detail in the "Lateral Color Correction" section of this specification. All three light beams are modulated simultaneously.

Figure 7:
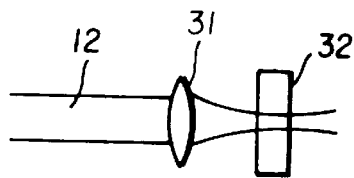
FIG. 7 is a schematic illustration of how one of the light beams is directed to one of the modulators of the printer of FIG. 6A.
Figure 8:
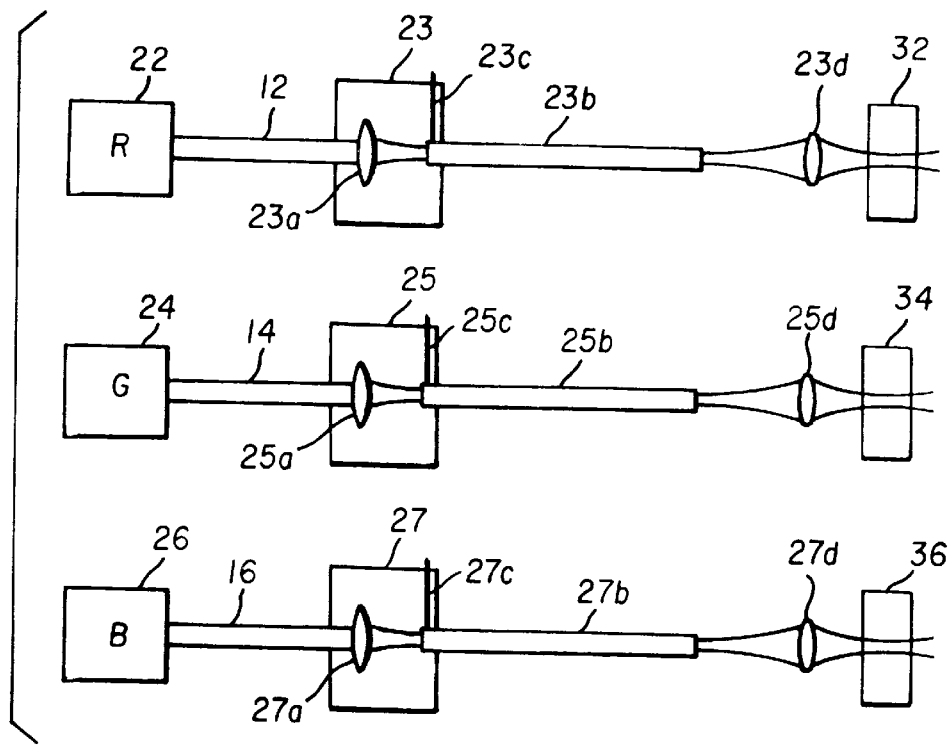
FIG. 8 is a schematic illustration showing how the light beams may be coupled to fibers and then directed to the modulators of the printer of FIG. 6A.

Two embodiments are shown in FIGS. 7 and 8 to couple light beams 12, 14, 16 from the laser sources to the modulators. FIG. 7 shows that a laser light beam 12 is directed to the modulator 32 through a monochromatic focusing lens 31 to form a beam waist size at the modulator. A similar arrangement is used for the light beams 14 and 16. FIG. 8 shows that, alternatively, the light beams 12, 14, 16 may be coupled to a single mode fiber through a fiber optic connector 23, 25, 27. The fiber optic connector includes a first focusing lens 23a, 25a, 27a, a fiber 23b, 25b, 27b, and a fiber holder 23c, 25c, 27c with a mechanical motion capability to precisely locate and maintain the position of the fiber with respect to the laser beam 12, 14 and 16 so as to maximize the amount of light coupled into the fiber. The beam waist formed on the end of the fiber 23b, 25b, 27b is re-imaged by a second focusing lens 23d, 25d, 27d to form an appropriate beam waist at the modulator 32, 34, 36. More specifically, the fiber 23b, 25b, 27b circularizes the beam and a circular beam waist is then formed at the modulator 32, 34, 36.

The modulated light beams are optically combined into the single light beam 42 by an optical combiner such as a conventional fiber optic multiplexer 40 (as shown in FIG. 6A). The fiber optic multiplexer 40 has appropriate fiber connectors (similar to fiber optic connectors 23, 25, 27) to couple the light beams exiting the modulators to the input fibers 40a, 40b, 40c of the fiber optic multiplexer 40. The fiber optic multiplexer 40 produces a beam waist of different size in each of the three colors at the output end of a beam combining fiber 40d. That is, all three beam waists are formed at the same location. The radii of these waists (at the $1/e^2$ power level) in this embodiment are: 0.00189 mm at λ=532 nm (green color), 0.00172 mm at λ=457.9 nm (blue color) and 0.00237 mm at λ=685 nm (red color). The shapes of the beam waists formed at the output end of the beam combining fiber 40d are circular.

The combined beam (of red, blue and green components) exits the multiplexer 40 (at the output end of the fiber) as a single light beam 42 traveling (co-axially) along an optical axis 41 (which is common to the three components) and is directed first towards an apochromatic focusing lens 50, and then to a single set of beam shaping optics 52 (FIG. 6A). The focusing lens 50 re-images the three beam waists (red, green, blue) produced at the output end of the fiber 40d to a second set of larger size beam waists, and thereby decreases the divergence of the three combined light beams. The decreased divergence allows room for the Bravais lens 200 and the beam shaping optics 52. The focusing lens 50 is apochromatic (i.e., free from chromatic aberration) to insure that the three larger size (i.e., imaged) circular beam waists are located in a common plane. The three larger size beam waists produced by the focusing lens 50 comprise the composite beam waist 210 and constitute the input to the Bravais lens 200 and to the beam shaping optics 52.

The beam shaping optics 52 includes two cylindrical mirrors 54 and 56. The first cylindrical mirror 54 has power only in the page direction. The second cylindrical mirror 56 has power only in the line direction. In one actual embodiment, the first cylindrical mirror 54 has concave radius of −119.146 mm in the x-z plane and is tilted in the x-z plane to deviate the single light beam by six degrees. The cylindrical mirror 56 has concave radius of −261.747 millimeters in the y-z plane and is tilted in the y-z plane to restore the light beam direction to the direction that it had prior to impinging on the cylindrical mirror 54. The cylindrical mirrors 54 and 56 cause the single light beam to converge in both the line and page direction. However, the amounts of convergence are different. The cylindrical mirror 54 shapes the single light beam 42 so as to form three waists, one for each of the three wavelengths, in the page direction. These three waists (red, green and blue) are located essentially in the same plane 57 at or near the polygon facet 61 (See FIG. 6A and 6B). The cylindrical mirror 56 shapes the single light beam so as to form three waists, one for each of the three wavelengths, in the line direction. These three waists (red, green, blue) are located essentially in the same plane 73 approximately one meter away behind the first vertex $V_1$ of the f-θ lens 70 (see FIGS. 6B and 10A). The sizes and locations of these waists for each of the three wavelengths are provided in the "Beam Shaping and Pyramid Correction" section of this specification. The printer system of the present embodiment is convenient for use with any beam shaping optics producing waists at the locations given in the "Beam Shaping and Pyramid Correction" section of the specification.

As stated above, after being shaped by the shaping optics 52, the single light beam 42 is directed towards the polygon facet 61. Although a rotating polygon deflector may be used in the invention, other deflectors or scanning means may be employed, so long as they are capable of deflecting the single light beam by a sufficient amount at the high speed required by the printer. At the center of a scan line (here defined as 0° polygon rotation), the single light beam's angle of incidence on the polygon facet 61 is 30 degrees. The light beam 42 striking the polygon facet 61 and the single light beam 42 reflected from the polygon facet 61 form a plane which is normal to the direction of the polygon's axis of rotation 63. In other words, the angle of incidence has no component in the page direction.

Upon reflection from the polygon facet 61, the deflected light beam 42 enters the f-θ scan lens 70 as it is being scanned in a plane which is perpendicular to the axis of rotation 63 of the polygon. As described above, this single light beam 42 (also referred as an input beam when discussed in conjunction with the f-θ lens) comprises three coaxial coherent laser light beams having respective wavelengths of 458 nm, or 532 nm and 685 nm and has beam characteristics determined by the fiber optic multiplexer 40, focusing lens 50, the Bravais lens 200 (when inserted into the beam) and the beam shaping cylindrical mirrors 54 and 56. The f-θ lens 70, illustrated in FIG. 10A, includes means for correcting the primary axial color aberration. The f-θ lens 70 itself is uncorrected for lateral color. Thus red, blue and green spots on the print medium are separated as shown schematically in FIG. 9. The overall printer 5 is corrected for lateral color by modulating the three light beams at three different data rates as later described. The f-θ lens 70 is corrected so that residual lateral color errors (after a linear electronic correction is applied) are insignificant. The detail description as the f-θ lens 70 is provided in the "F-θ Lens" section of this specification.

After passing through the f-θ lens 70, the deflected light beam 42 reflects off a cylindrical mirror 80 (FIG. 10B) before it impinges on the photosensitive print medium 100. (See FIGS. 11A, 11C, 11D). The cylindrical mirror 80 has optical power in X-Z plane (page direction) only. It corrects for pyramid error of the polygon's facets. This is discussed in more detail in the "Beam Shaping and Pyramid Correction" section of the specification. A plano fold mirror 84 can be placed between the f-θ lens 70 and the cylindrical mirror 80 or between the cylindrical mirror 80 and an image surface 99 in order to place the image surface 99 in a desirable location, where it (at least in line scan direction) coincides with the photosensitive print medium 100. Such a fold mirror has no effect on the performance of the printer system. In the preferred embodiment of the present invention, the image surface 99 is a plane.

As stated above, the fiber optic multiplexer 40 produces a beam waist of different size in each of the three colors at the output end of the fiber 40d. Because the f-θ lens 70 is designed to work with the light beam 42 after it has passed through a common apochromatic focusing lens 50, a Bravais lens 200 and a common apochromatic beam shaping optics 52, the sizes of the three spots at the image surface 99 will be different for the three wavelengths. The spots at the image surface 99 will maintain the same relative sizes as the three waists located at the output end of the beam combining fiber 40d (of the fiber optic multiplexer 40). This variation in spot size between wavelengths does not significantly impact the perceived image quality.

In the actual embodiment, the radii of the spots produced by the printer 5 at the image surface 99 at the $1/e^2$ power level are: 0.035 mm at λ=532 nm, 0.032 mm at λ=457.9 nm, and 0.044 mm at λ=685 nm. When the Bravais lens 200 is inserted into the primary optical system 10, the size of the spots at the print medium 100 is increased by a factor of 1.43. As stated above, the image surface 99 of the f-θ lens 70 coincides with the location of the print medium 100. In this embodiment the print medium 100 is a conventional photographic paper. The paper rests on a planar support (not shown) which moves the paper in a predetermined direction. Writing with spots of this size onto print medium 100 over a scan line 12 inches long will produce sufficient resolution when the resulting prints are examined at a normal viewing distance. These spots (red, blue, green) refer to the images produced by the light beam on an instantaneous basis. These spots are produced in a series and their location changes with the rotation of the polygon. Each pixel on the page receives up to three spots, one for each color.

Beam Shaping

Figure 6B:
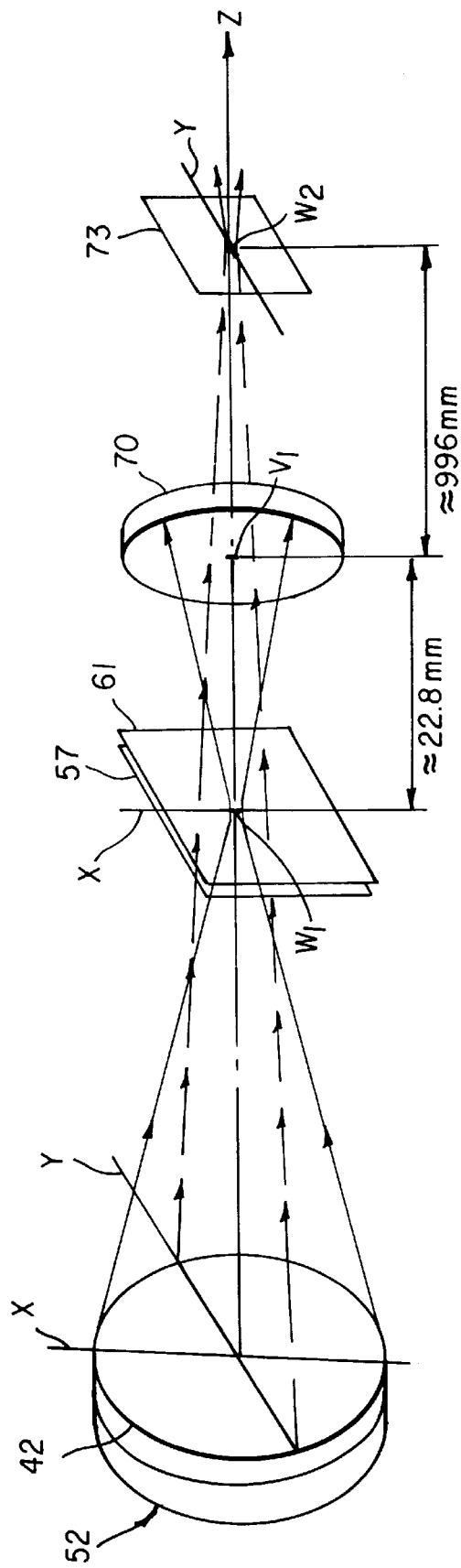
FIG. 6B illustrates schematically the formation of beam waists by a beam shaping optics.

As discussed in the previous section, the cylindrical mirrors 54 and 56 of the beam shaping optics 52 direct the single light beam 42 containing all three colors toward the polygon facet 61 and cause the single light beam 42 to converge in both the line and page direction. The "Beam shaping optics" is an optical system that shapes a light beam differentially in the line direction and in the page direction. In the printer 5, the single light beam 42 converges to a composite (red, green, blue) waist $W_1$ formed near the facet 61 in the X-Z or page direction, and toward a composite waist $W_2$ formed approximately 1 meter behind the frontmost vertex $V_1$ of the f-θ lens 70 in the Y-Z or line direction (FIG. 6B). Thus, the beam shaping optics 52 adjusts the spot size and converges the single light beam 42 by different amounts in the page and line direction. The beam convergence is much faster in the page direction than the line direction, this arrangement having been found to allow superior correction of the f-θ lens 70 and other post-polygon optics.

More specifically, in one embodiment, the focusing lens 50 and the beam shaping optics 52 produce a shaped light beam which converges in such a manner as to produce a green, page direction beam waist 22.904 mm in front of the first vertex $V_1$ of the f-θ lens 70 (i.e., this beam waist is located between the polygon facet 61 and the f-θ lens) and a green, line direction beam waist 995.7 mm behind the first vertex $V_1$ of the f-θ lens 70 (the line direction beam waist is located between the f-θ lens 70 and the image surface 99). The size of the beam waists may be adjusted by the beam shaping optics depending on the spot size desired at the image surface. For example the ($1/e^2$ power) radius of the green beam waist in e the line direction may be 0.114 mm and the ($1/e^2$ power) radius of the green beam waist in the page direction may be 0.0396 mm.

Similarly, the focusing lens 50 and the beam shaping optics 52 produce a shaped light beam 42 which converges in such a manner as to produce a blue, page direction beam waist 22.893 mm in front of the first vertex $V_1$ of the f-θ lens 70 and a blue, line direction beam waist 995.8 mm behind the first vertex of the f-θ lens. For example, the ($1/e^2$ power radius) of the blue beam waist in the line direction may be 0.104 mm and the ($1/e^2$ power) radius of the blue beam waist in the page direction may be 0.036 mm.

Similarly, the focusing lens 50 and the beam shaping optics 52 produce a shaped light beam which converges in such a manner as to produce a red, page direction beam waist 22.790 mm in front of the first vertex $V_1$ of the f-θ lens 70 and a red, line direction beam waist 995.9 mm behind the first vertex of the f-θ lens. For example, the ($1/e^2$ power) radius of the red beam waist in the line direction may be 0.144 mm and the ($1/e^2$ power) radius of the red beam waist in the page direction may be 0.0495 mm. When the Bravais lens 200 is inserted into the primary optical system 10, these waists are 1.4 time larger.

Polygon

The f-θ lens 70 of the preferred embodiment is designed to work with a variety of rotating polygons. This makes it particularly suitable for use with a dual format pre-objective scanner, for example, of the type described in the U.S. patent application Ser. No. 08/771,367, filed Dec. 16, 1996 in the name of Michael Harrigan, Badhri Narayan and Drew Summers which is incorporated by reference herein. It is particularly suitable for use with 10 facet polygons having an inscribed radius between 32.85 mm and 40.709 mm. These polygons are rotated by +/±13.5 degrees to produce a scan line 12 inches long at the image surface 99.

The f-θ lens 70 also works well with 24 facet polygons having an inscribed radius between 38.66 mm and 44 mm. These polygons are rotated by +/−5.625 degrees to produce scan lines 5 inches long at the image surface 99.

F-θ Lens

The lens 70 is arranged in the optical path of the primary optical system 10 of the printer 5 as shown in FIGS. 11A–D.

Figure 10A:
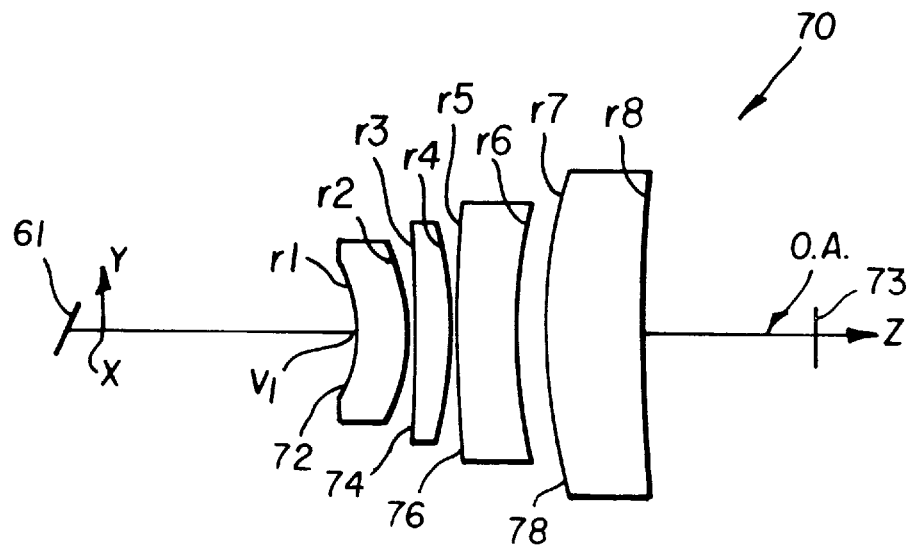
FIG. 10A is a top plan view showing the lens element arrangement in an f-θ lens.
Figure 10B:
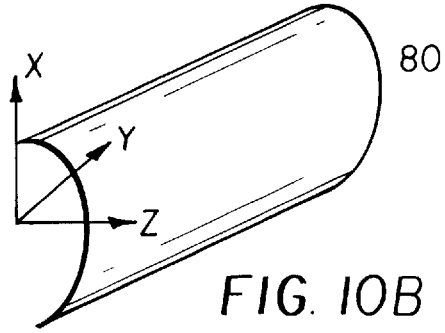
FIG. 10B shows an embodiment of a cylindrical mirror.

As shown in FIG. 10A, the optical axis O. A. of the f-θ lens 70 extends in a direction referred to herein as the Z direction. When the polygon rotates (for line scanning) the light beam 42 is scanned in the Y direction. (See FIGS. 12A–12C). The cross-scan (also referred to as the page direction) is in the X direction.

Figure 9:
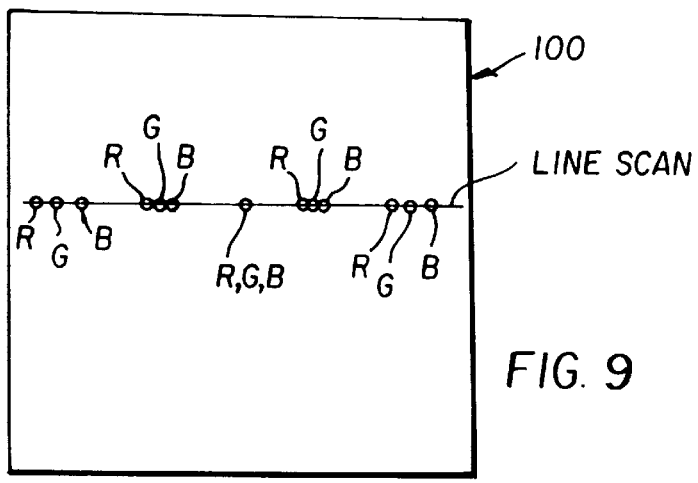
FIG. 9 illustrates schematically color separation along a scan line on the surface of a print medium.

The f-θ lens 70 described herein is particularly suitable for use in the laser printer 5. Due to the lateral color present in the f-θ lens 70, the printer 5 simultaneously produces three spatially separated scanning spots on the print medium 100 (FIG. 9). Each of the three spots contains energy in one of the three laser wavelengths. This separation is compensated for in a manner described in the "Lateral Color Correction" section of this specification. To summarize, the spots are superimposed on the proper pixels of the print medium 100 when the data rates at which the three light beams are modulated are linearly adjusted to compensate for the lateral color of the f-θ lens 70.

Ideally, the lateral color should be completely corrected with no residual errors by using three different data rates to move data between the digital image store and the laser modulator control circuitry. The spots should ideally travel in a straight line, at uniform velocities (as the polygon is rotated with uniform angular velocity), and should not significantly change their size and shape as they travel down the line. If necessary, the variation in the spot velocities can be compensated for by adjusting the data rate as the spots move across the scan line. The spots should have approximately circular shapes, with energy distributions which are approximately Gaussian. The spot diameter at the $1/e^2$ level should be about 60–105 μm (in green light) in order to achieve sufficient resolution at the photosensitive medium, the smaller size being necessary to achieve overprinting of fine text on a picture. It is preferred that this spot diameter be 64–88 μm.

A further requirement of an f-θ scan lens 70 of the preferred embodiment is that it be readily manufacturable at a reasonable cost. This requires that the lens have spherical surfaces on relatively low cost glass.

Figure 11A:
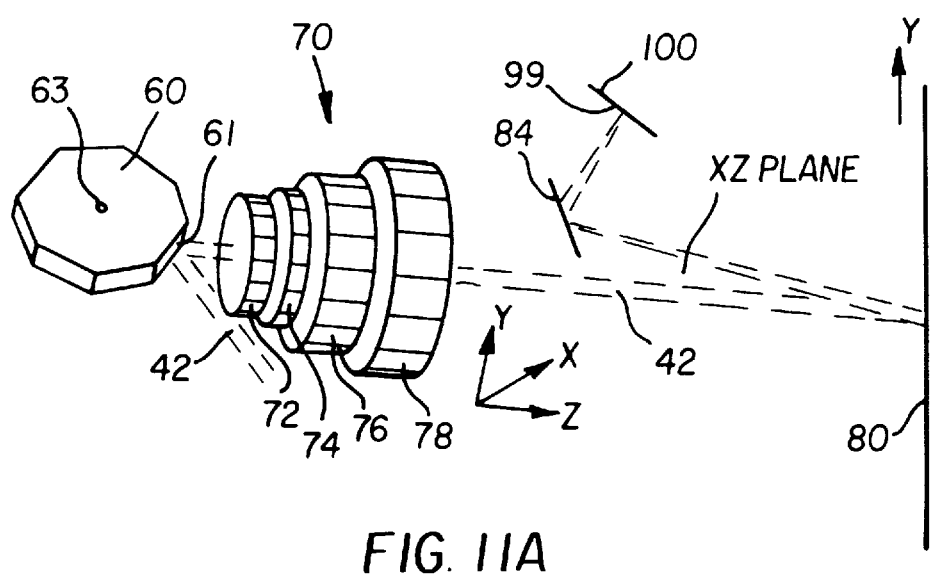
FIG. 11A is a schematic elevational view showing the f-θ lens of FIG. 10A in combination with a plano mirror and the cylindrical mirror, and a deflected light beam going through the f-θ lens and striking the print medium.

The f-θ lens 70 satisfies all of the above requirements. This f-θ lens 70 is shown in FIGS. 10A and 11A. The f-θ lens 70 includes four lens components arranged along an optical axis. They are: a first lens component 72 of negative optical power, a second lens component 74 of positive optical power, a third lens component 76 of negative optical power, and a fourth lens component 78 of positive optical power.

The lens components satisfy the following relationships:

$-1.6 < f_1/f < -0.9$;

$0.38 < f_2/f < 0.5$;

$-0.65 < f_3/f < -0.50$;

$0.73 < f_4/f < 0.9$, where $f_1$ is the focal length of the first lens component, $f_2$ is the focal length of the second lens component, $f_3$ is the focal length of the third lens component, $f_4$ is the focal length of the fourth lens component, and f is the focal length of the f-θ lens 70. The lens component 72 is a meniscus negative element, concave toward the polygon side. Lens component 74 is a meniscus positive lens element, also concave toward the polygon. Lens component 76 is a meniscus negative lens element, concave toward the image surface 99. Lens component 78 is a meniscus positive lens element, also concave toward the image surface 99. In the exemplary f-θ lens 70, the lens elements are formed of Schott glass with the lens element 72 being a BK7 type, the lens element 74 being LAK-21 glass, the lens element 76 being an SFL-56 glass, and the lens element 78 being an F-2 type glass. The f-θ lens 70 is achromatic. In this embodiment, the first lens component 72 is a single lens element satisfying the following equation:

$Vd_1 > 60$;

where $Vd_1$ is the V-number of the first lens component material.

The details of the elements in lens 70 are shown in TABLE 5A.

In this table, the radii of curvature (r1–r8) and thicknesses of the lens elements are in millimeters.

TABLE 5A

| SURF | RADIUS | THICKNESS | INDEX | V NUMBER |
|---|---|---|---|---|
| Entrance Pupil | | 24.00 | Polygon facet | |
| 1 | 32.9695 | 10.634 | 1.517 | 64.2 |
| 2 | −44.780 | 0.925 | AIR | |
| 3 | −341.050 | 7.654 | 1.641 | 60.1 |
| 4 | −85.6131 | 0.836 | AIR | |
| 5 | 423.736 | 12.550 | 1.785 | 26.1 |
| 6 | 129.480 | 6.034 | AIR | |
| 7 | 139.081 | 19.689 | 1.620 | 36.4 |
| 8 | 403.727 | | | |

The following tables 5B–5D show the f-θ compliance and the relative spot velocity achieved in the green, red and blue light for the f-θ lens when it is used with a 10 facet polygon having an inscribed radius of 32.85 mm.

TABLE 5B

F-Theta compliance and instantaneous spot velocity data:
$\lambda = 532$ nm

| CFG NBR | ROT ANGLE | IDEAL RAYHT | ACTUAL RAYHT | DELTA RAYHT | PERCENT ERROR | REL VEL |
|---|---|---|---|---|---|---|
| 1 | 0.000 | 0.000 | 0.000 | 0.000 | 0.000 | 1.0000 |
| 2 | 4.500 | −51.075 | −49.907 | 1.168 | −2.286 | 1.0100 |
| 3 | 9.000 | −102.150 | −100.885 | 1.265 | −1.238 | 1.0428 |
| 4 | 13.500 | −153.225 | −153.981 | −0.756 | 0.493 | 1.0926 |
| 5 | −4.500 | 51.075 | 49.982 | −1.093 | −2.139 | 1.0131 |
| 6 | −9.000 | 102.150 | 101.194 | −0.956 | −0.936 | 1.0494 |
| 7 | −13.500 | 153.225 | 154.703 | 1.478 | 0.965 | 1.1024 |

TABLE 5C $\lambda = 457.9$ nm

| CFG NBR | ROT ANGLE | IDEAL RAYHT | ACTUAL RAYHT | DELTA RAYHT | PERCENT ERROR | REL VEL |
|---|---|---|---|---|---|---|
| 1 | 0.000 | 0.000 | 0.000 | 0.000 | 0.000 | 1.0000 |
| 2 | 4.500 | −51.046 | −49.875 | 1.171 | −2.294 | 1.0100 |
| 3 | 9.000 | −102.092 | −100.824 | 1.268 | −1.242 | 1.0430 |
| 4 | 13.500 | −153.138 | −153.891 | −0.753 | 0.492 | 1.0927 |
| 5 | −4.500 | 51.046 | 49.951 | −1.095 | −2.146 | 1.0132 |
| 6 | −9.000 | 102.092 | 101.136 | −0.956 | −0.937 | 1.0497 |
| 7 | −13.500 | 153.138 | 154.624 | 1.486 | 0.970 | 1.1026 |

TABLE 5D $\lambda = 685$ nm

| CFG NBR | ROT ANGLE | IDEAL RAYHT | ACTUAL RAYHT | DELTA RAYHT | PERCENT ERROR | REL VEL |
|---|---|---|---|---|---|---|
| 1 | 0.000 | 0.000 | 0.000 | 0.000 | 0.000 | 1.0000 |
| 2 | 4.500 | −51.134 | −49.964 | 1.169 | −2.287 | 1.010 |
| 3 | 9.000 | −102.267 | −101.000 | 1.267 | −1.239 | 1.0428 |
| 4 | 13.500 | −153.401 | −154.159 | −0.759 | 0.495 | 1.0928 |
| 5 | −4.500 | 51.134 | 50.040 | −1.094 | −2.139 | 1.0131 |
| 6 | −9.000 | 102.267 | 101.309 | −0.958 | −0.937 | 1.0484 |
| 7 | −13.500 | 153.401 | 154.880 | 1.479 | 0.964 | 1.1026 |

If necessary, the variation in the spot velocities can be compensated for by adjusting the rate at which data in the digital image store (described in the "Lateral Color Correction" section) is moved to the circuitry controlling the laser modulators. The adjustment amount is the same for each of the modulators.

The following Table 6 shows how the spots grow as the polygon is rotated and the spot moves across the scan line. This data is for a 10 facet polygon having an inscribed radius of 40.709 mm. A polygon rotation of ±13.5 degrees corresponds to a scan position of approximately ±6 inches at the image surface 99.

TABLE 6

$1/e^2$ spot sizes (mm) at image surface computed from astigmatic Gaussian beam trace using the following $1/e^2$ waist radii at an object plane:
$\lambda = 532$ nm, $\omega = .00189$; $\lambda = 457.9$ nm, $\omega = .00172$; $\lambda = 685$ nm, $\omega = .00237$.
Effects of beam truncation are not included in this computation.

| POLYGON ROTATION | 13.500° | 9.000° | 4.500° | 0.000° | −4.500° | −9.000° | −13.500° |
|---|---|---|---|---|---|---|---|
| $\lambda = 532$ | | | | | | | |
| $\omega y$ | 0.0417 | 0.0376 | 0.0360 | 0.0357 | 0.0360 | 0.0375 | 0.0399 |
| $\omega x$ | 0.0362 | 0.0355 | 0.0352 | 0.0352 | 0.0353 | 0.0356 | 0.0360 |
| $\lambda = 457$ | | | | | | | |
| $\omega y$ | 0.0415 | 0.0357 | 0.0335 | 0.0331 | 0.0334 | 0.0355 | 0.0387 |
| $\omega x$ | 0.0332 | 0.0325 | 0.0322 | 0.0321 | 0.0323 | 0.0326 | 0.0330 |
| $\lambda = 685$ | | | | | | | |
| $\omega y$ | 0.0510 | 0.0470 | 0.0453 | 0.0449 | 0.0453 | 0.0470 | 0.0497 |
| $\omega x$ | 0.0450 | 0.0444 | 0.0441 | 0.0440 | 0.0442 | 0.0444 | 0.0448 | where ωy=line direction $1/e^2$ spot radius and ωx=page direction $1/e^2$ spot radius Pyramid Error Correction Scanning systems using a rotating polygon deflectors are subject to an image defect known as banding, which is most easily seen in areas of the image where it is free of subject detail, i.e., a blank wall or a cloud free sky scene. Light and dark bands, which are not part of the desired image, will appear in these areas. These bands are caused by repetitive non-uniform spacing of the scan lines. The banding is caused by a facet, or facets, on the polygon which are tilted slightly out of position. Thus, every time the facet which is out of position comes around, it will cause the light beam to move ever so slightly out of the nominal light beam plane—i.e., the light beam plane formed by a rotating light beam in the absence of any pyramid error. After going through the f-θ lens, this misplaced light beam will land in a slightly different position on the image surface, generating what is known as "cross-scan" error, since the position error is in a direction which is perpendicular to the scan line. An f-θ lens must function with the other optical elements in the printer system to produce an image which is free from banding when a "good" polygon is used, that is, a polygon in which pyramidal angle errors on the polygon facets do not exceed +/−10 arc seconds, as measured with respect to the axis of rotation of the polygon.

In one embodiment of the present invention, the pyramid error is corrected by keeping the polygon facet 61 conjugate with the image surface 99 in the page meridian (X-Z plane). (Conjugate points are defined herein as any pair of points such that all rays from one are imaged on the other within the limits of validity of Gaussian optics). This conjugation is achieved by the cylindrical mirror 80 (FIG. 10B) working in conjunction with f-θ lens 70. Thus, there is a focal point (beam waist) at both the polygon facet 61 and at the photosensitive print medium 100, and the polygon facet is thereby conjugated to the photosensitive print medium 100. As a result, if the polygon facet 61 is tilted slightly in the X-Z plane, that is, around the "object" point, the path of the rays through the printer 5 is slightly different from that shown in the figure, but the rays all go to the same "image" point, and the cross-scan error is zero.

The conjugation condition described above imposes requirements on the beam shaping optics. Conjugation of the polygon facet 61 and the print medium 100 in the page direction implies that in the page direction, a beam waist (for each wavelength) is located at (or is adjacent to) both locations. That is, the beam waist $W_1$ needs to be located at or near the polygon facet 61, and needs to be imaged at or near the print medium 100. Hence, the beam shaping optics 52 must produce a beam waist $W_1$ in the page direction at or near the polygon facet 61. This is achieved in the current design as is discussed in the "Beam Shaping" section and shown in FIG. 6B. It is preferred that the beam waist $W_1$ be located less than 15/100 from the polygon facet 61 (where f is the focal length of the 100 f-θ lens 70).

The degree of convergence (of the single light beam 42) in the line direction is not similarly constrained. In the present embodiment, the beam shaping optics 52 converge the single light beam 42 in the line direction to form a beam waist $W_2$ behind the rear focal point of the f-θ lens 70. It is preferred that the beam waist $W_2$ in the line direction at a distance be at least ⅓ f behind the first vertex $V_1$ of the-θ lens. In the Primary Optical System 10 the distance between the rear surface of the f-θ lens 70 and the waist location (in the line direction) is approximately equal to the focal length of the f-θ lens 70 (i.e., within 20%). More specifically, the f-θ lens 70 has a focal length of 424.9 mm and the line direction waist formed by the beam shaping optics 52 is located 494.6 mm behind the rear focal point. This arrangement has been found to allow superior correction of the f-θ lens and other post-polygon optics, as well as providing a compact system.

The conjugating cylindrical mirror 80 (FIG. 10B) is located between the f-θ lens 70 and the photosensitive print medium 100 (FIG. 11A). As stated above, it corrects for the pyramid error of the polygon facets by conjugating, in the X-Z plane, the polygon facet 61 with the print medium 100. This cylindrical mirror 80 has a concave radius (in the page direction) of 190.500 mm and is located 152.772 mm behind the last vertex of the f-θ lens. The cylindrical mirror 80 is tilted by 7 degrees and deviates the single light beam 42 by 14 degrees. The image surface 99 (which is coplanar with the print medium 100) is located 162.37 mm behind the cylindrical mirror 80, the distance being measured along the deviated light beam. As mentioned above, various plano fold mirrors 84 may be placed in the scanning system without affecting its performance.

Figure 12A:
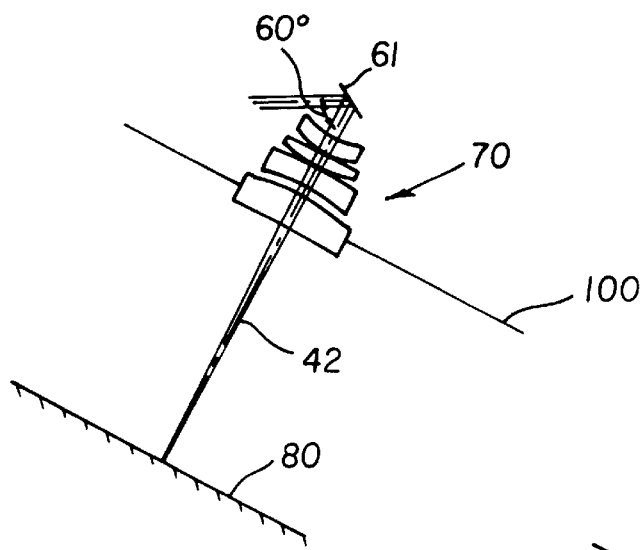
FIGS. 12A–12C are plan views of the f-θ lens, the plano mirror and the cylindrical mirror illustrated in FIG. 11A. More specifically.
Figure 12B:
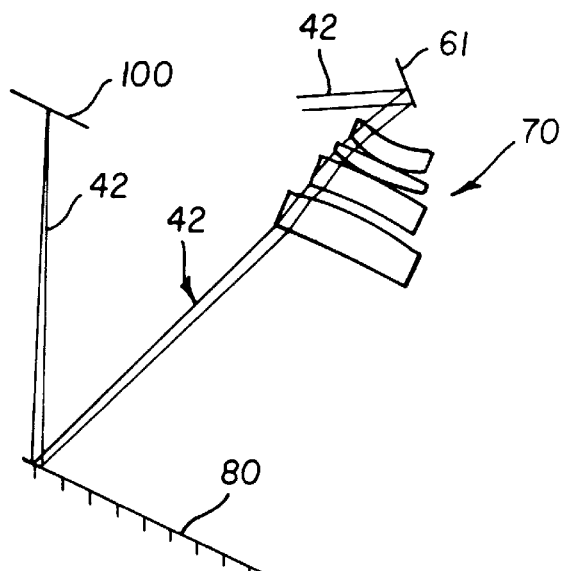
Figure 12C:
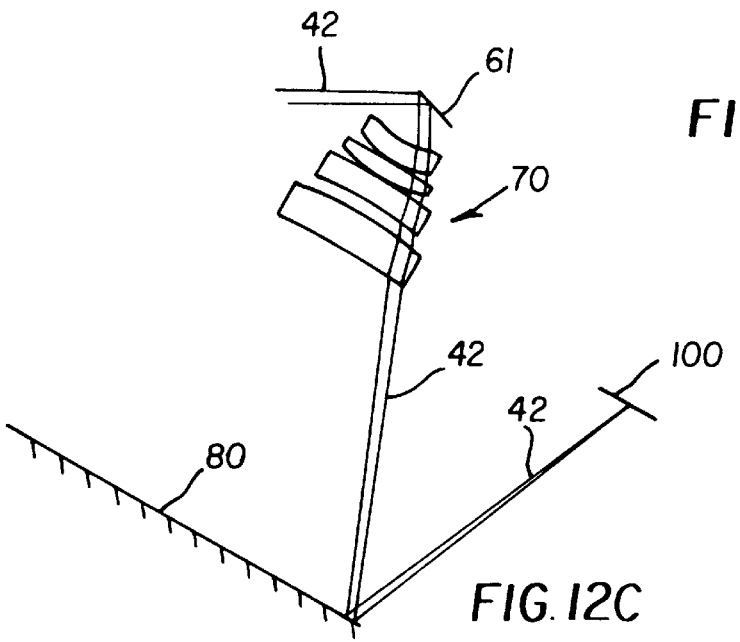

FIGS. 12A, 12B, 12C show the position of the light beam 42 on the photosensitive print medium 100 (located at the image surface 99) for polygon rotations of +13.5, 0, and −13.5 degrees respectively. This represents scan angles of +27,0, and −27 degrees, respectively.

More specifically, in Table 7, the computed cross-scan image displacements for the chief (central) rays of the light beam (at wavelengths of 532 nm, 457 nm and 685 nm) are tabulated. It will be seen that the cross-scan displacements are certainly well within acceptable limits.

Table 7 shows the cross-scan displacement due to 10 arc seconds of pyramid error on polygon facet. The displacement units are micrometers.

TABLE 7

| | | CROSS-SCAN DISPLACEMENT | | |
|---|---|---|---|---|
| POLYGON ROTATION | FIELD ANGLE | λ = 532 nm | λ = 457 nm | λ = 685 nm |
| 4.5° | 9.0° | 0.00487427 | 0.01486833 | −0.00450393 |
| 9.0° | 18.0° | 0.00618239 | 0.01585018 | −0.00277660 |
| 13.5° | 27.0° | −0.00083809 | 0.00830530 | −0.00910482 |
| −4.5° | −9.0° | 0.00866035 | 0.01961167 | −0.00161741 |
| −9.0° | −18.0° | 0.01091159 | 0.02255675 | 0.00012253 |
| −13.5° | −27.0° | −0.00820700 | 0.00387091 | −0.01910646 |
| none | 0.0° | 0.00525818 | 0.01565464 | −0.00453669 |

Axial Color Aberration

The word "vergence", as used herein refers to whether a light beam is collimated, converging or diverging. A collimated beam has zero vergence, a diverging light beam has negative vergence and a converging light beam has positive vergence.

There are two kinds of color aberrations in any lens system: axial color and lateral color. Axial color causes light of different wavelengths to come to a focus at different distances from the rear surface of the lens system. Since axial color is a focus-related phenomenon, it is caused not only by aberrations in a lens system itself but also by the vergence of the input light beam to the lens system.

After the combination by the fiber optic multiplexer such as the one disclosed in the U.S. Pat. No. 5,666,447, the single light beam 42 passes through a common optical system comprising focusing optics, beam shaping optics, polygon, f-θ lens, cylindrical conjugating mirror, and optional piano fold mirrors until it reaches the image surface.

Figure 13:
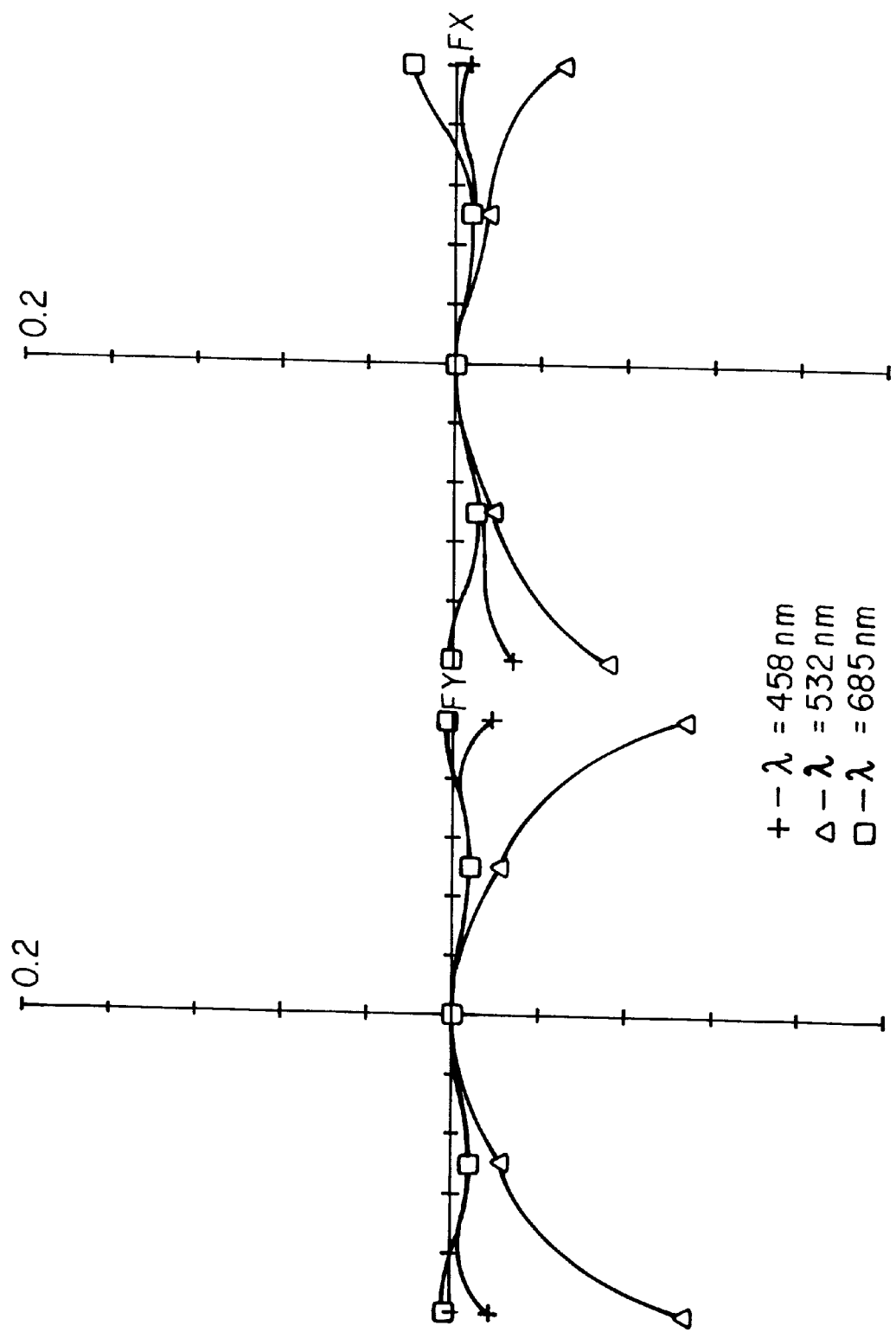
FIG. 13 is a an aberration plot showing the optical path differences at the center of a scan line in all three wavelengths.

In the printer 5, the line direction vergences of the green, blue, and red light beams entering to f-θ lens 70 cannot be adjusted independently because the beam shaping optics 52 is common to the three (combined) light beams. This makes the correction of the axial color difficult. For the printer 5, the axial color must be corrected when the three color light beams entering the f-θ lens 70 have essentially the same amount of vergence. This is what has been done in the f-θ lens 70, as is shown in the OPD (Optical Path Difference) plots in FIG. 13, which correspond to f-θ lens performance at the center of the line scan. The construction of the f-θ lens 70 is disclosed in the "F-θ lens" section of the application.

The axial color of the optical system in the page direction must be corrected between the polygon facet and the image surface, in order to prevent color banding due to pyramid errors. Otherwise, the pyramid error will only be corrected in a single color. In the printer 5, the axial color is corrected in both meridians, all the elements are spherical, a costly cemented cylindrical doublet is unnecessary, and the pyramid error is corrected with a conjugating cylindrical mirror.

Lateral Color Correction

As stated previously, the lateral color aberration of the F-θ lens 70 is uncorrected. Lateral color of any lens is the variation in image height of focused spots having different wavelengths, or colors, taken in a specified image surface. For example, in normal photographic objectives for use in color photography, lateral color is typically measured by Y'(at $\lambda_1$=486.1 m)–Y'(at $\lambda_2$=656.3 nm); this is the difference in image height, taken in the gaussian focal plane for 546.1 nm, between the blue point image and the red point image. Lateral color, as opposed to axial color, only occurs away from the optical axis, out in the field of the lens. Usually, the farther away from the axial image point, the greater the amount of lateral color. Thus, the largest amount of lateral color often occurs near the edge of the field of view of the lens. In case of a printer 5, the lateral color is exhibited as a separation of red, blue and green spots along the scan line at the print medium (FIG. 9).

Figure 14:
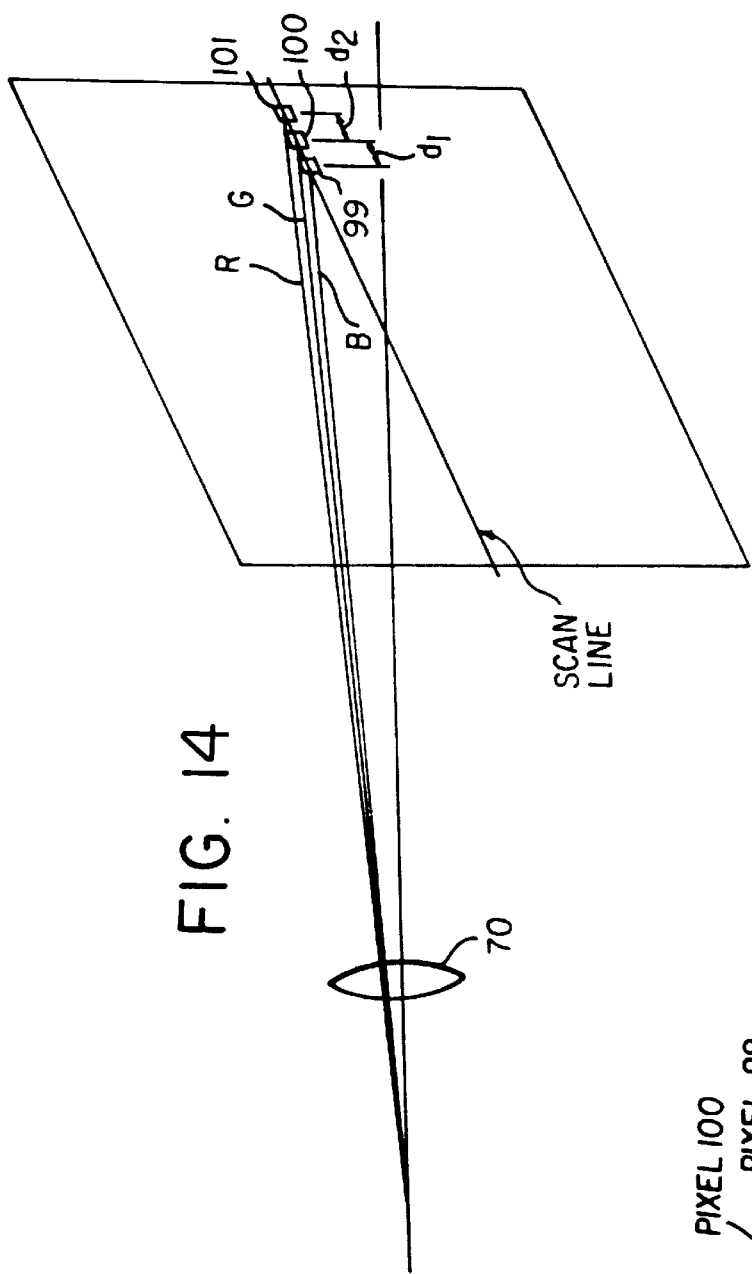
FIG. 14. illustrates schematically how different color beams intercept pixels at a given time $T_1$.

The lateral color in the printer 5 is corrected by modulating the three light beams at three different data rates. To understand this, consider the following hypothetical example: Suppose the data rates were the same and that the lateral color in an f-θ lens is such that for a given amount of polygon rotation the green light beam intercepts the image surface at a location of the 100th pixel whereas the red light beam intercepts the image surface at a location 101 st pixel and the blue light beam intercepts the image surface at a location 99th pixel (FIG. 14). For example, if the printer worked at 512 dots per inch, the blue and green spots would be separated by a distance $d_1$=1/512 inch and the red and green spots would be separated by a distance $d_2$=1/512 inch. The rate at which data is moved from a digital image store to the circuitry controlling the laser modulators is determined by three data clocks $C_1$, $C_2$, $C_3$ (FIG. 6A). One clock controls the data rate for the green channel, a second controls the data rate for the blue channel, an a third controls the data rate for the red channel. If these three clocks are run at the same rate, then, at any instant in time, the three laser intensities correspond to the required green, blue and red intensity values for the same pixel. Due to the spot separation produced at the image surface by the lateral color in the f-θ'lens, the image recorded on the print medium will show color fringing in the vicinity of the 100th pixel. More specifically, there will be color fringing of two pixels between red and blue, one pixel between green and red and one pixel between green and blue.

Figure 15:
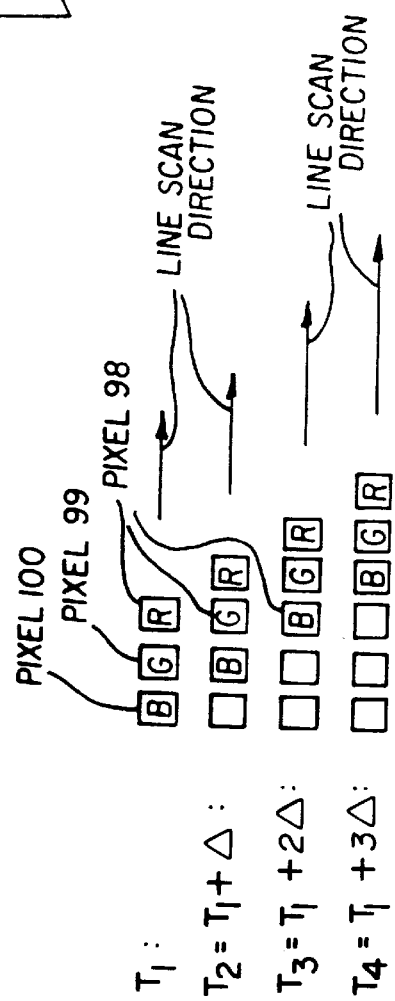
FIG. 15 is a schematic illustration showing different pixels at the print medium receiving red, green and blue light beams at different times.

Now suppose that the blue data clock is run at a frequency (i.e., data rate) $f_B$ which is 99% of the green clock frequency $f_G$ and that the red clock is run at a frequency $f_R$ which is 101% of the green clock frequency. At the given amount of polygon rotation, the green light beam will intercept the image surface at a location of the 100th pixel and the modulation of the light beam is appropriate to produce the exposure of the 100th pixel. Likewise, at this same polygon rotation, the red light beam still intercepts the image surface at a location of the 101st pixel. However, since the red clock is being run at 101% of the frequency of the green clock, the red light beam is now correctly data modulated to give the proper exposure for the 101st pixel. Similarly the blue light beam is on the 99th pixel, but the blue laser light is now data modulated to give the proper exposure for the 99th pixel. That is, at any given time (or at any given polygon rotation position) the laser printer 5 may produce three color spots but the image information contained in each one of the three color beams is different—i.e., it corresponds to different pixels. So at same time $T_1$, pixel 98 will receive the red beam R, at time $T_1$+Δ the pixel 98 will receive the green beam G, and in time $T_1$+2Δ it will receive the blue beam B (FIG. 15). This way, when the printer is operating in locations other than the center of the line scan, each pixel can receive, red, green and blue image modulated light, albeit at a different time. Therefore, there will be no color fringing. Thus, in the printer 5, the data rates $f_B$, $f_G$ and $f_R$ are not the same. More specifically, the data rates are $f_B=k_1\times f_G$, $f_R=k_2\times f_G$, where $k_1$ and $k_2$ are constants chosen to compensate for spot separation during the line scan.

In any laser printer system, there is a detection procedure to determine a specific starting location for each line on the photosensitive medium. In a printer 5, this is done by utilizing a "split" (dual) detector and the (unmodulated) red light beam to generate the initial start up pulse. More specifically, the split detector detects the presence of the light beam and from its location (with respect to the beginning of the line), determines the time delays needed for starting of the modulation of each of the three light beams, so that the appropriate pixel at the beginning of the line scan is exposed with the light beam carrying the proper data information.

A potential problem remains that the same clock rates which produced good results for an image location on the 100th pixel might still produce color fringing at other pixels. However, in the printer 5, these residual lateral color errors have been corrected in the f-θ lens 70 so that the worst residual error (due to the lateral color aberration) over the entire scan line is less than 20% of the size of a green pixel. This is shown in tables 6 and 8. Table 6 shows the spot size across the scan line. Table 8 shows the residual lateral color when the light beams are modulated at the rates shown at the bottom of the table. Both of these tables are for a 10 facet polygon with an inscribed radius of 40.709 mm. Similar results hold for the other 10 facet polygon sizes. The results for the 24 facet polygons are much better.

TABLE 8

Difference in line direction image position (in millimeters) for red, green and blue colors with red, green and blue pixel clocks in drive electronics adjusted in the ratio of 1.0011:1.0000:0.99943.

| ROT ANGLE | (λ = 57)-(λ = 532) Residual Error (Blue-Green) | (λ = 685)-(λ = 532) Residual Error (Red-Green) |
| --- | --- | --- |
| 4.500 | 0.003 | 0.001 |
| 9.000 | 0.004 | 0.002 |
| 13.500 | 0.003 | −0.003 |

TABLE 8-continued

Difference in line direction image position (in millimeters) for red, green and blue colors with red, green and blue pixel clocks in drive electronics adjusted in the ratio of 1.0011:1.0000:0.99943.

| ROT ANGLE | (λ = 57)-(λ = 532) Residual Error (Blue-Green) | (λ = 685)-(λ = 532) Residual Error (Red-Green) |
|---|---|---|
| −4.500 | −0.003 | −0.001 |
| −9.000 | −0.000 | −0.003 |
| −13.500 | 0.007 | 0.001 |

Green λ = 532 nm; Blue λ = 457.9 nm; Red λ = 685 nm

In a laser printer 5 incorporating the f-θ lens 70, the system parameters are as follows:

Wavelengths: 532, 457.9, and 685 nm
Scan length: 12 inches
Polygon Duty Cycle: 0.75
Polygon inscribed radius: 32.85 through 40.709
Number of polygon facets: 10
Total Scan angle: 54 degrees. (+/−27 degrees with respect to the optical axis; +/−13.5 degrees of polygon rotation)
Light beam input angle onto polygon facet: 60 degrees from optical axis of f-θ lens (30 degree angle of incidence on polygon facet)
Desired gaussian beam radius at the exp(−2) power point: 0.035 mm at λ=532 nm.

The system parameters can also be as follows:
Wavelengths: 532, 457.9, and 685 nm
Scan length: 5 inches
Polygon Duty Cycle: 0.75
Polygon inscribed radius: 38.66 through 44.00
Number of polygon facets: 24
Total Scan angle: 22.5 degrees. (+/−11.25 degrees with respect to the optical axis; +/−5.625 degrees of polygon rotation)
Light beam input angle onto polygon facet: 60 degrees from optical axis of f-θ lens (30 degree angle of incidence on polygon facet)
Desired gaussian beam radius at the exp(−2) power point: 0.051 mm at 532 nm.

As stated above, the f-θ lens 70 itself is not corrected for lateral color. Correction of the lateral color in the scanner requires running the green, blue, and red clocks modulating the lasers in the ratio 1:000:0.99943:1.0011.

As disclosed in the "Axial Color Aberration" section of this specification, the f-θ scan lens 70 by itself is corrected for primary axial color. This is a requirement for this type of scanner because the beam shaping optics 52 is common to the three light beams. In the X-Z direction, the f-θ scan lens 70 conjugates the polygon facet to the image surface, (in all three wavelengths), this requires the use of an auxiliary cylindrical mirror element, having power in only the X-Z plane. Assuming the "object" is at the polygon facet, the axial color in the X direction for the f-θ lens 70 is zero; it is also zero for the cylindrical mirror and, hence, the conjugation is close all three wavelengths.

The foregoing description of the invention is merely exemplary and minor changes and modifications to the invention as described are possible and wholly within the scope of the invention as set forth in the appended claims.

PARTS LIST

| | |
|---|---|
| 2,4 | Photoprints |
| 5 | Laser Printer |
| 10 | Primary Optical System |
| 12,14,16 | light beams |
| 22,24,26 | laser light sources |
| 23,25,27 | fiber optics connector |
| 31 | monochromatic focusing lens |
| 32,34,36 | modulators |
| 40 | fiber optic multiplexer |
| 40d | output end of the fiber optic multiplexer |
| 42 | light beam |
| 50 | focusing lens |
| 52 | beam shaping optics |
| 54,56 | cylindrical mirrors |
| 57 | waist formation plane |
| 60 | polygon scanner |
| 61 | polygon facet |
| 70 | f-θ lens |
| 73 | waist formation plane |
| 72,74,76,78, | lens components of the f-θ lens |
| 80 | cylindrical mirror |
| 84 | plano fold mirror |
| 99 | image surface |
| 100 | print medium |
| 200 | Bravais Lens |
| 200' | reverse Bravais lens |
| 210,230 | composite beam waists |
| 222 | positive lens group |
| 224 | negative lens group |
| 222' | negative lens group |
| 224' | positive lens group |

What is claimed is:

1. A dual resolution printer for printing images on an associated print medium, said printer comprising:
   (i) a light source providing a light beam;
   (ii) a focusing lens focusing said light beam and creating a converging light beam having at least one beam waist of at least one wavelength, said beam waist having a first beam waist location and a first beam waist size;
   (iii) an optical unit movable in and out of the converging light beam provided by said focusing lens and having a corresponding first position and second position, respectively,
   said optical unit, in said second position, reimaging said one beam waist of said converging light beam created by said focusing lens to a second beam waist, said second beam waist having a second beam waist location and a second beam waist size, said second beam waist size being different from said first beam size and said second beam waist location being substantially the same as said first beam waist location.

2. A dual resolution printer according to claim 1 wherein said two positions of said optical unit correspond to two different spot sizes at the associated print medium, providing said printer with appropriate spot sizes when printing in low and high resolution modes.

3. A dual resolution printer according to claim 1 wherein said optical unit is a Bravais type lens.

4. A dual resolution printer according to claim 1 wherein said second beam waist is larger than said first beam waist.

5. A dual resolution printer for printing images on an associated print medium, said printer comprising:
   (i) a light source providing a light beam;
   (ii) a focusing lens focusing said light beam and creating a converging light beam having at least one beam waist of at least one wavelength, said beam waist having a first beam waist location and a first beam waist size;

(iii) a deflector scanning said light beam after said light beam passed through said focusing lens;

(iv) an f-θ optics located between said deflector and said associated print medium, said f-θ optics imaging a spot of a predetermined size on the associated print medium; and (v) an optical unit movable in and out of the converging light beam created by said focusing lens, said optical unit having a corresponding first position and second position, respectively, said optical unit, in said second position, reimaging said one beam waist of said converging light beam created by said focusing lens to a second beam waist, said second beam waist having a second beam waist location and a second beam waist size, said second beam waist size being different from said first beam size and said second beam waist location being substantially the same as said first beam waist location.

6. A dual resolution printer according to claim 5 wherein said two positions of said optical unit correspond to two different spot sizes at the associated print medium, providing said printer with appropriate spot sizes when printing in low and high resolution modes.

7. A dual resolution printer according to claim 6, comprising at least three light sources, said light sources together providing at least one red laser light beam, one blue laser light beam and one green laser light beam, said deflector being a rotating polygon; and said optical unit being a Bravais lens.

8. A dual resolution printer according to claim 6, comprising at least three light sources, said light sources together providing at least one red laser light beam, one blue laser light beam and one green laser light beam, said deflector being a rotating polygon; and said optical unit being a reverse Bravais lens.

9. A dual resolution printer according to claim 5 wherein said optical unit is a Bravais type lens.

10. A dual resolution printer according to claim 5 wherein said second beam waist is larger than said first beam waist.

11. A dual resolution printer for printing images on an associated print medium selectively in a high resolution mode and a low resolution mode, said printer comprising:

(i) a plurality of laser light sources, each providing one light beam;

(ii) an optical combiner combining said light beams into a common light beam;

(iii) a focusing lens focusing said common light beam and creating a waist;

(iv) beam shaping optics shaping said common light beam after said common light beam passes through said focusing lens;

(v) a deflector scanning said the light beam shaped by said beam shaping optics;

(vi) an f-θ optics located between said deflector and said associated print medium; and said printer characterized in that an optical unit reimages said beam waist to a different size second beam waist, said optical unit is being movable in and out of the common light beam thereby providing (a) large spot sizes when operating in said low resolution mode and (b) small spot sizes when operating at high resolution mode.

12. A dual resolution printer for imaging onto an associated print medium, said printer comprising:

(i) a light source providing a light beam;

(ii) optics adapted to create a converging light beam having a beam waist of at least one wavelength, of a predetermined size and position;

(iii) a scanner positioned to intercept and to scan said shaped light beam;

(iv) an f-θ optics located between said scanner and the associated print medium adapted to image a spot of a predetermined size and position on the associated print medium; and (v) an optical unit movable between a first position into the converging light beam and a second position removed out the converging light beam, said optical unit, in said first position, reimaging said beam waist of said converging light beam to a second beam waist of a size different from said predetermined size and located a substantially the same predetermined position.

* * * * *